(12) United States Patent
Popovic et al.

(10) Patent No.: US 8,860,732 B2
(45) Date of Patent: Oct. 14, 2014

(54) SYSTEM AND METHOD FOR ROBUST PHYSICALLY-PLAUSIBLE CHARACTER ANIMATION

(75) Inventors: Jovan Popovic, Seattle, WA (US); Sergey V. Levine, Redmond, WA (US)

(73) Assignee: Adobe Systems Incorporated, San Jose, CA (US)

( * ) Notice: Subject to any disclaimer, the term of this patent is extended or adjusted under 35 U.S.C. 154(b) by 559 days.

(21) Appl. No.: 12/956,971

(22) Filed: Nov. 30, 2010

(65) Prior Publication Data

US 2013/0127873 A1 May 23, 2013

Related U.S. Application Data

(60) Provisional application No. 61/386,915, filed on Sep. 27, 2010.

(51) Int. Cl.
*G06T 13/00* (2011.01)
*G06T 13/40* (2011.01)

(52) U.S. Cl.
CPC ................................. *G06T 13/40* (2013.01)
USPC .......................................................... 345/473

(58) Field of Classification Search
None
See application file for complete search history.

(56) References Cited

U.S. PATENT DOCUMENTS

| | | | | |
|---|---|---|---|---|
| 6,057,859 | A | * | 5/2000 | Handelman et al. ........... 345/474 |
| 6,414,684 | B1 | * | 7/2002 | Mochizuki et al. ............ 345/473 |
| 7,573,477 | B2 | * | 8/2009 | Ng-Thow-Hing ............ 345/473 |
| 2004/0036711 | A1 | * | 2/2004 | Anderson ..................... 345/701 |
| 2005/0071306 | A1 | | 3/2005 | Kruszewski et al. |
| 2009/0002376 | A1 | | 1/2009 | Xu et al. |
| 2009/0135189 | A1 | | 5/2009 | Kim et al. |
| 2010/0277483 | A1 | | 11/2010 | Lee et al. |

OTHER PUBLICATIONS

Abe, Y., Da Silva, M., and Popovic',J. 2007. Multiobjective control with frictional contacts. In SCA '07: Proceedings of the 2007 ACM SIGGRAPH/Eurographics symposium on Computer animation, pp. 249-258, Aug. 2007.
Arikan, O., and Forsyth,D.A.2002.Interactive motion generation from examples. In SIGGRAPH '02: ACM SIGGRAPH 2002 papers, ACM, New York, NY, USA, pp. 483-490, Jul. 2002.
Coros, S., Beaudoin, P., and Van De Panne, M. 2010.Generalized biped walking control. In SIGGRAPH '10: ACM SIGGRAPH 2010 papers, ACM, New York, NY, USA, pp. 1-9, Jul. 2010.
De Lasa, M., Mordatch, I., and Hertzmann, A. 2010. Feature-based locomotion controllers. pp. 1-10, Jul. 2009.

(Continued)

*Primary Examiner* — Edward Martello
(74) *Attorney, Agent, or Firm* — Wolfe-SBMC

(57) ABSTRACT

An interactive application may include a quasi-physical simulator configured to determine the configuration of animated characters as they move within the application and are acted on by external forces. The simulator may work together with a parameterized animation module that synthesizes and provides reference poses for the animation from example motion clips that it has segmented and parameterized. The simulator may receive input defining a trajectory for an animated character and input representing one or more external forces acting on the character, and may perform a quasi-physical simulation to determine a pose for the character in the current animation frame in reaction to the external forces. The simulator may enforce a goal constraint that the animated character follows the trajectory, e.g., by adding a non-physical force to the simulation, the magnitude of which may be dependent on a torque objective that attempts to minimize the use of such non-physical forces.

20 Claims, 13 Drawing Sheets

(56) References Cited

OTHER PUBLICATIONS

Jain, S., Ye, Y., and Liu, C. K. 2009. Optimization-based interactive motion synthesis. ACM Transactions on Graphics 28, 1, pp. 1-12, Dec. 2009.

Kovar, L., Gleicher, M., and Pighin, F. 2002. Motion graphs. In SIGGRAPH '02: ACM SIGGRAPH 2002 papers, ACM, New York, NY, USA, pp. 473-482, Jul. 2002.

Lee, J., Chai, J., Reitsma, P. S. A., Hodgins, J. K., and Pollard, N. S. 2002. Interactive control of avatars animated with human motion data. In SIGGRAPH '02: ACM SIGGRAPH 2002 papers, ACM, New York, NY, USA, pp. 491-500, Jul. 2002.

Lee, Y., Kim, S., and Lee, J. 2010. Data-driven biped control. In SIGGRAPH '10: ACM SIGGRAPH 2010 papers, ACM, New York, NY, USA, pp. 1-8, Jul. 2010.

Liu, L., Yin, K., Van De Panne, M., Shao, T., and Xu, W. 2010. Sampling-based contact-rich motion control. In SIGGRAPH '10: ACM SIGGRAPH 2010 papers, ACM, New York, NY, USA, pp. 1-10, Jul. 2010.

Mordatch, I., De Lasa, M., and Hertzmann, A. 2010.Robust physics-based locomotion using low-dimensional planning. In SIGGRAPH '10: ACM SIGGRAPH 2010 papers, ACM, New York, NY, USA, pp. 1-8, Jul. 2010.

Muico, U., Lee, Y., Popovic', J., and Popovic', Z. 2009. Contact-aware nonlinear control of dynamic characters. In SIGGRAPH '09: ACM SIGGRAPH 2009 papers, ACM, New York, NY, USA, pp. 1-9, Aug. 2009.

Treuille,A.,Lee,Y., and Popovic',Z. 2007. Near-optimal character animation with continuous control. In SIGGRAPH '07: ACM SIGGRAPH 2007 papers, ACM, New York, NY, USA, pp. 1-7, Aug. 2007.

Wu, J.-C., and Popovic', Z. 2010. Terrain-adaptive bipedal locomotion control. In SIGGRAPH '10: ACM SIGGRAPH 2010 papers, ACM, New York, NY, USA, pp. 1-10, Jul. 2010.

Yin, K., Cords, S., Beaudoin, P., and Van De Panne, M. 2008. Continuation methods for adapting simulated skills. In SIGGRAPH '08: ACM SIGGRAPH 2008 papers, ACM, New York, NY, USA, pp. 1-7, Aug. 2008.

Johansen, Rune S., "Automated Semi-Procedural Animation for Character Locomotion", *Masters Thesis, Department of Information and Media Studies, Aarhus University*, (May 25, 2009), 114 pages.

\* cited by examiner

SYSTEM AND METHOD FOR ROBUST PHYSICALLY-PLAUSIBLE CHARACTER ANIMATION

PRIORITY INFORMATION

This application claims benefit of priority of U.S. Provisional Application Ser. No. 61/386,915 entitled "System and Method for Robust Physically-Plausible Character Animation" filed Sep. 27, 2010, the content of which is incorporated by reference herein in its entirety.

BACKGROUND

Description of the Related Art

In many interactive applications, such as games and virtual worlds, animated characters form a critical component of the user experience. In order to simulate an animated character with a particular repertoire of animations in a virtual environment, it is necessary to enable the character to respond to physical events, such as collisions, pushes and pulls, and complex rough terrain. In recent years, advances in character control have enabled these applications to include characters that can walk on uneven terrain, follow a specified reference motion, or recover from some types of perturbations. These characters are typically animated using a physical simulator.

Current methods for animating characters are limited in their reliability, however, because a controller for a physically simulated character can always fail if a sufficiently large external force is applied, and cannot simulate characters moving in inherently non-physical ways, (e.g., cartoon or superhuman characters). Even a human being, possessing a control mechanism far more advanced than any simulated character, can fail under a sufficiently large perturbation, and it is natural that the physics-based methods currently applied in character animation would be unable to cope with demands for non-physical motion. Currently, such non-physical characters must be handled either with non-physical animation techniques such as motion graphs (which are unable to produce the same variety of responses to external perturbations), or else must be made physically consistent (at the cost of losing their non-physical style).

SUMMARY

Various embodiments of systems and methods for performing robust, physically-plausible character animation are described herein. In some embodiments, an interactive application (such as a game or virtual world application) may include a quasi-physical simulator configured to determine the configuration of animated characters as they are maneuvered within the application and as they are acted on by external forces. In some embodiments, the quasi-physical simulator may include, or may be configured to work together with, a parameterized animation module or another kinematic animation method, which may be configured to synthesize and provide reference poses from example motion clips.

The quasi-physical simulator may in some embodiments receive input defining a trajectory for an animated character during execution of an interactive application. The animated character may be modeled in the quasi-physical simulation as a kinematic tree comprising rigid links and revolute joints. In some embodiments, the trajectory, which may be specified by a user (e.g., through a GUI of the interactive application or may be provided by the animation module), may define a desired path for a goal-constrained component of the character (e.g., the root or the center of mass of the character, a designated joint of the character, or a designated group of joints).

In some embodiments, in response to receiving input representing one or more external forces acting on the animated character, the quasi-physical simulator may be configured to determine a pose for the animated character in the current animation frame in reaction to the external forces. For example, the quasi-physical simulator may perform a quasi-physical simulation that enforces a goal constraint that the character follows the desired trajectory, even as it reacts to external forces that perturb its motion. In some embodiments, in order to enforce the goal constraint, the quasi-physical simulator may add a non-physical force to the simulation. The magnitude of the added non-physical force may be dependent on a torque objective in the quasi-physical simulation that attempts to minimize the use of such non-physical forces. Once a pose has been determined for the animated character in response to the external forces, it may be displayed and/or stored (e.g., as an element of an animation frame).

In some embodiments, determining a reference pose for the animated character may include blending or warping multiple references poses for the character (which may be obtained from a collection of reference poses), e.g., using a parameterized animation module. For example, a parameterized animation module may be configured to receive a motion clip exhibiting one or more character motions, to automatically divide each of the character motions into reference segments, and to associate a respective set of parameter values (e.g., parameter values representing the character's velocity in the sagittal and coronal planes, and the completion percentage of the current gait cycle) with each frame in each reference segment. The parameterized animation module may then compute (i.e. synthesize) additional references poses for other sets of parameter values dependent on the sets of parameter values associated with the frames in the reference segments. In some embodiments, in addition to determining a pose for a current animation frame (based on a set of parameter values), the parameterized animation module may be configured to determine a set of parameter values for the next animation frame dependent on the parameter values associated with the reference poses that were blended to generate the pose for the current frame.

In some embodiments, the quasi-physical simulation may utilize a pose objective that tracks a reference motion for the animated character, and/or an end-effector objective that tracks the movement of any joints of the animated character that are in contact with the environment, in addition to a torque objective. In various embodiments, the quasi-physical simulator may continue to receive input defining the trajectory for the animated character, to receive input representing external forces acting on the animated character (in some animation time steps), to determine poses for the animated character as it follows the desired trajectory (and, if applicable, in reaction to external forces), and to display the animated character in its determined poses for any number of animation frames in a given animation exercise.

Figure 1:
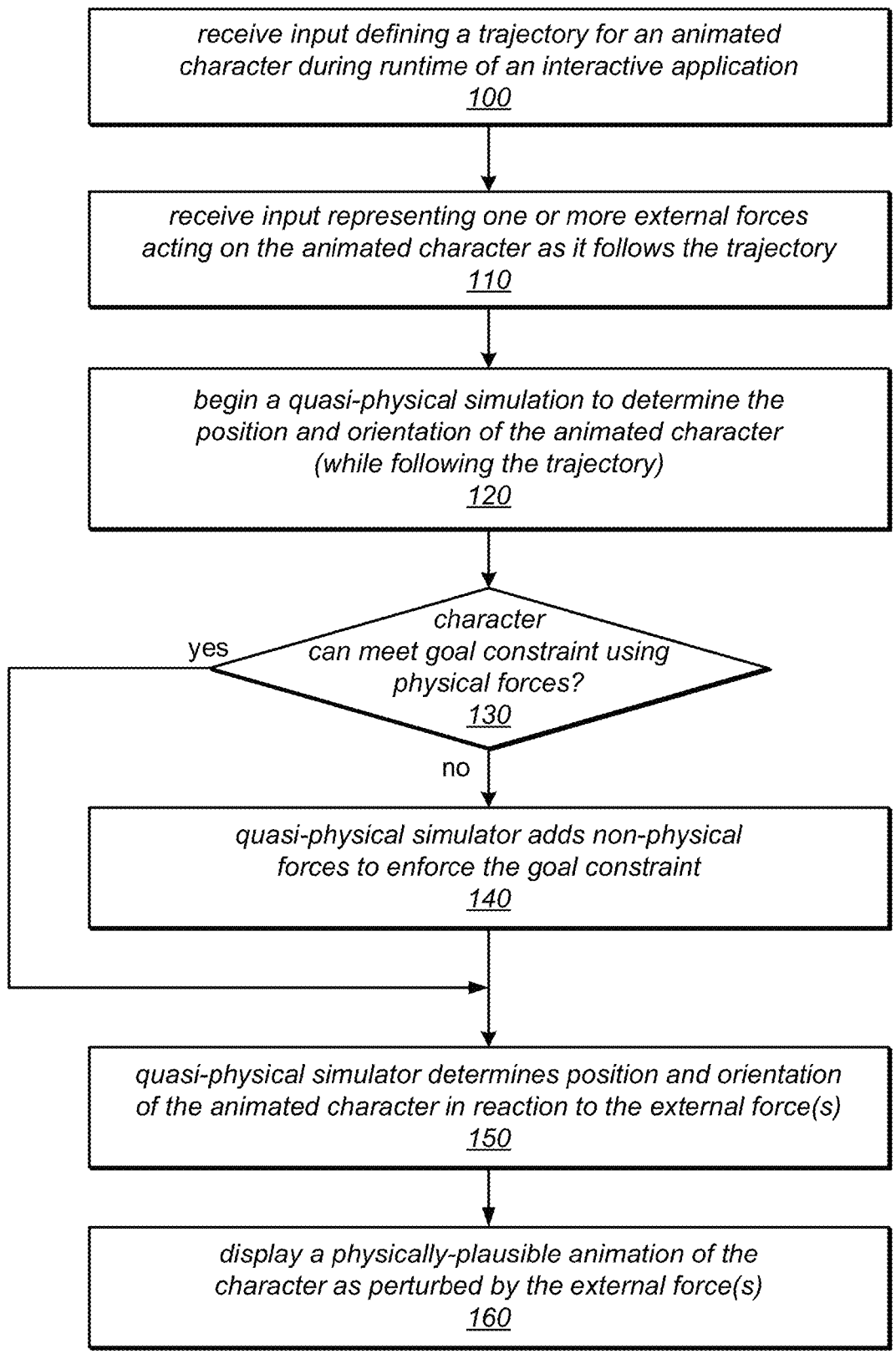
FIG. 1 is a flow diagram illustrating a method for performing robust physically-plausible character animation, according to some embodiments.

While various embodiments are described herein by way of example for several embodiments and illustrative drawings, those skilled in the art will recognize that embodiments are not limited to the embodiments or drawings described. It should be understood, that the drawings and detailed description thereto are not intended to limit the embodiments to the particular form disclosed, but on the contrary, the intention is to cover all modifications, equivalents and alternatives falling within the spirit and scope of the disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of systems and methods for implementing robust physically-plausible character animation are described herein. Physical simulation provides an attractive avenue for synthesizing character responses to external forces, uneven terrain, and other physical events. Unfortunately, introducing physics into character animation may allow large disturbances to severely alter the character's trajectory, causing the character to enter an unrecoverable state (such as falling), and precludes the animation of inherently non-physical behavior, such as cartoon or super-human motion. Although more sophisticated controllers can help alleviate the former problem, a large enough force can always cause a failure. In some embodiments, the quasi-physical approach to character animation described herein may produce physically plausible motions while respecting hard robustness constraints and following potentially non-physical reference motions. These methods may allow for the application of non-physical forces on the character's root to ensure that the robustness constraints are obeyed, but may minimize these forces to produce a physically plausible motion. In other words, in various embodiments, the quasi-physical simulations described herein may include non-physical force and/or may allow an animated character to follow a non-physical reference motion. The application of this method has been demonstrated by animating the locomotion of characters on rough terrain and under large disturbance forces.

As noted above, the quasi-physical simulation approach described herein may in various embodiments produce physically plausible responses to perturbations while providing hard guarantees on the robustness of a simulated character. The animation methods described herein may in some embodiments be implemented by a quasi-physical simulator that accepts as input a series of reference poses. These reference poses may be synthesized online by an animation module, or may be taken directly from an animation clip, in different embodiments, and they may not need to be physically consistent. Therefore, in some embodiments the quasi-physical simulator described herein may be used to reliably reproduce stylized cartoon animations. The quasi-physical simulator described herein may in some embodiments apply non-physical forces to the character's root to ensure that robustness constraints are obeyed as the simulated character follows a reference motion. These non-physical forces may also be used to ensure that non-physical reference motions can be followed accurately, while still providing physically plausible reactions to external perturbations.

As previously noted, animated characters form a critical component of the user experience in many interactive applications, such as games and virtual world applications. Designers of virtual environments carefully craft the behaviors of their characters, and demand that they behave according to their specifications. Physical control, with the possibility of undesired failure in the presence of large disturbances, represents a dangerous unknown for these critical characters. If a user-controlled avatar trips and falls unexpectedly, the user is likely to experience frustration. Since the quasi-physical simulator described herein can provide guarantees on the character's robustness, a designer may precisely specify the high level behavior of the character (e.g., in the form of center of mass trajectories), and can be sure that the character will not fall unless such behavior is permitted. If a large enough perturbation is applied, the character may appear non-physical, but such artifacts are temporary and largely visual. The failure of a physical controller used in current animations, on the other hand, is more permanent, because it requires the character to switch to another behavior (such as standing back up), and can severely impact the user experience.

As described herein, the quasi-physical simulation described herein has been evaluated in the context of character animation. In addition, a parameterized animation module (such as those described herein) has been constructed that produces reference poses for the simulation to follow. As described in more detail below, the animation module may blend between a series of reference clips based on the character's velocity, and may be particularly well suited for locomotion under external disturbance forces. The appearance of several quasi-physically simulated animated characters on a variety of terrain types and under different perturbations has been evaluated in a system that employs one such animation module.

In some embodiments, the quasi-physical simulation module described herein may accept as input the previous, current, and next reference poses, and may generate the current simulated pose for the character. As noted above, the reference poses may be obtained directly from an animation clip, or they may be produced dynamically by an animation module, in various embodiments. The simulated trajectory generated by the quasi-physical simulation may be guaranteed to obey a goal constraint. In some embodiments, this constraint may be used to force a goal-constrained component of the character (e.g., the character's root, center of mass, designated joint, or group of joints) to follow a user-prescribed trajectory. For example, modern games often prescribe a character's center of mass motion directly via the game logic, using an animation module to generate a plausible animation for the desired center of mass trajectory. This makes center of mass motion a natural goal constraint for the simulation, in some embodiments.

In some embodiments, the quasi-physical simulation described herein may always be able to satisfy the goal constraint by applying non-physical forces on the character's root, if the goal constraint cannot be met with physical forces alone. To ensure that the character still appears physically plausible, the simulation may attempt to minimize the use of these non-physical forces. This may result in physically plausible behavior when disturbances are small, and may ensure that the goal constraints are satisfied when the disturbances are large.

In some embodiments, the quasi-physical simulations described herein may employ a parameterized animation module that is particularly suited for locomotion and that takes advantage of the goal constraints offered by the simulation. The animation module may accept as input any number of animations for the character that demonstrate its locomotion in different directions and/or at different speeds. At runtime, the system may blend between these clips based on the character's current velocity. As long as the reference clips cover the space of velocities reasonably well, this method may produce a reasonable guess for a velocity-appropriate motion, though its velocity may not perfectly match that of the character. The goal constraint of the quasi-physical simulation may then be used to force the final motion to have precisely the desired velocity. Since external perturbations may cause a change in the character's center of mass velocity, the animation module may be able to generate believable responses, such as protective steps, while the quasi-physical simulation may provide the "involuntary" effects of such perturbations, such as swinging of the arms or deflection of the upper body.

FIG. 1 is a flow diagram illustrating a method for performing robust physically-plausible character animation, according to some embodiments. In various embodiments, the operations illustrated in FIG. 1 may be implemented in software, in hardware, or in a combination of hardware and software. For example, in some embodiments, they may be performed by one or more modules of an interactive application that provides a character animation feature or by one or more standalone software modules configured to perform these operations. As illustrated at 100, in this example, the method may include receiving input defining a trajectory for an animated character during runtime of an interactive application. For example, in some embodiments such a trajectory may be defined by user input, such as when a user manipulates an animated character through a GUI or another input mechanism (e.g., a game controller) in an interactive game application. In some embodiments, a reference motion may be received from an animation replay module, according to a trajectory of a similar character in a reference clip. In still other embodiments, such a reference motion may be automatically generated, e.g., by interpolating between two reference positions for the character. In some embodiments, the trajectory may represent the path that a goal-constrained component of the animation character (e.g., a point corresponding to the character's center of mass, a designated joint or group of joints, or another point designated to be a goal-constrained component). As described above, the defined trajectory may serve as a goal constraint for the animation, in some embodiments.

As illustrated in this example, the method may include receiving input representing one or more external forces that act on the animated character as it attempts to follow the defined trajectory, as in 110. For example, the character may be subjected to various external forces in the form of collisions, pushes, pulls, and/or contact with the environment (e.g., slopes, steps, or complex rough terrain). Such forces may be specified by a user (e.g., through a GUI or game controller), or may be applied automatically by the interactive application, in different embodiments.

As illustrated at 120, the method may in some embodiments include performing a quasi-physical simulation to determine the position and orientation of the animated character in reaction to the external forces (while the character follows its defined trajectory). For example, if the character is pushed, it may bend over, lean back, speed up, slow down, or turn. In another example, if the character walks up or down a steep slope, its feet may change position as each one comes in contact with the ground. If the character cannot meet its goal constraint while these external forces are being applied (i.e. if it cannot continue to follow its defined trajectory in the face of these external forces) using physical forces, shown as the negative exit from 130, the method may include the quasi-physical simulator adding non-physical forces to the simulation in order to enforce the goal constraint, as in 140. Note that in some embodiments, the non-physical forces added to the simulation may be minimized in order to produce a result that most closely resembles a realistic motion (e.g., to reduce stiffness or artificial look to the motion). In other words, the simulation may optimize its computations such that the influence of any added non-physical forces is kept to a minimum.

If the character can meet its goal constraint while these external forces are being applied using physical forces, shown as the positive exit from 130, the quasi-physical simulator may not add any non-physical forces to the simulation. This is shown as the path from 130 to 150. Once the quasi-physical simulator has determined the position and orientation of the animated character in reaction to the external forces, as in 150, the method may include displaying a physically-plausible animation of the character as perturbed by the external forces, as in 160. Various methods for performing a quasi-physical simulation are described in more detail below.

In some embodiments, the systems described herein may represent an animated character as a kinematic tree consisting of rigid links and revolute joints. In some embodiments, the root of the kinematic tree (which may be conventionally taken to be the pelvis, for human and/or animal based characters) may be modeled as a six degree of freedom joint. When this joint is unactuated, the kinematic tree may be said to have a floating base. In some embodiments, the configuration of the character at time step k may be described by a vector $q_k$, each entry of which is the current angle of a joint. In some embodiments, the first three entries may give the position of the character's root, e.g., in Cartesian coordinates.

In some embodiments, the velocities of the character's joints may be computed with finite differences as follows:

$$v_k = \frac{q_k - q_k - 1}{\Delta t} \quad (1)$$

The accelerations of the joints may be related to the current, previous, and next configurations as follows:

$$a_k = \frac{q_{k=1} - 2q_k + q_{k+1}}{\Delta t^2} \quad (2)$$

Together, these finite difference equations may suggest a straightforward integration rule, sometimes called a Verlet integrator. Given the current and previous configuration, together with the accelerations at the current time step, the configuration at the next time step may in some embodiments be given by the following:

$$q_{k+1} = 2q_k - q_{k-1} + \Delta t^2 a_k$$

Note that in order to be physically consistent, the character's acceleration must respect the equations of motion, as follows:

$$M(q_k)a_k + C(q_k, v_k) = J_c^T f_e + T \quad (3)$$

In this equation, $M(q_k)$ may represent the configuration-dependent mass matrix, which may be computed with the Composite Rigid Body algorithm; $C(q_k, v_k)$ may represent the sum of Coriolis, centripetal, and gravitational forces, computed with Recursive Newton-Euler; T may represent the vector of joint torques, and $J_c^T f_e$ may represent the influence of external contact forces. The influence of these external contacts may be converted from Cartesian coordinates into joint-space by using the contact Jacobian $J_c$. The masses of the individual links in the character's body may be estimated, for simplicity, to be proportional to their lengths, although it may be possible for the user to specify link masses directly, in some embodiments.

Since contacts with the ground can exert only normal and frictional forces, in some embodiments the net force at each contact must lie within a "friction cone". This friction cone may limit the maximum tangent force to a fraction of the normal force. The system described herein may in some embodiments approximate the friction cone with a polygonal cone, constraining the external force to lie in the positive column-space of the cone basis matrix $V_c$. In such embodiments, the external force may then be expressed as $f_e = V_c \lambda$, where $\lambda_i \geq 0$. While contact forces may also be constrained by complementary conditions that ensure that the contact force performs no actual work, it has been found that this condition may (in some embodiments) be dropped without severely compromising the results.

Note that in a rigid body simulation, the equations of motion can be solved for $a_k$ when $\tau$ and $\lambda$ are known. Various control techniques attempt to optimize an objective function in terms of $\tau$, $\lambda$ and $a_k$, subject to the constraint imposed on the relationship between these quantities by the equations of motion. Since the character's root is unactuated, physically consistent controllers must also constrain the first six entries of $\tau$ to be zero. This is the source of much of the difficulty in physical control, since without this unactuated joint, any acceleration would be possible at every time step. The techniques described herein may in some embodiments overcome, or mitigate, such difficulties.

Figure 2:
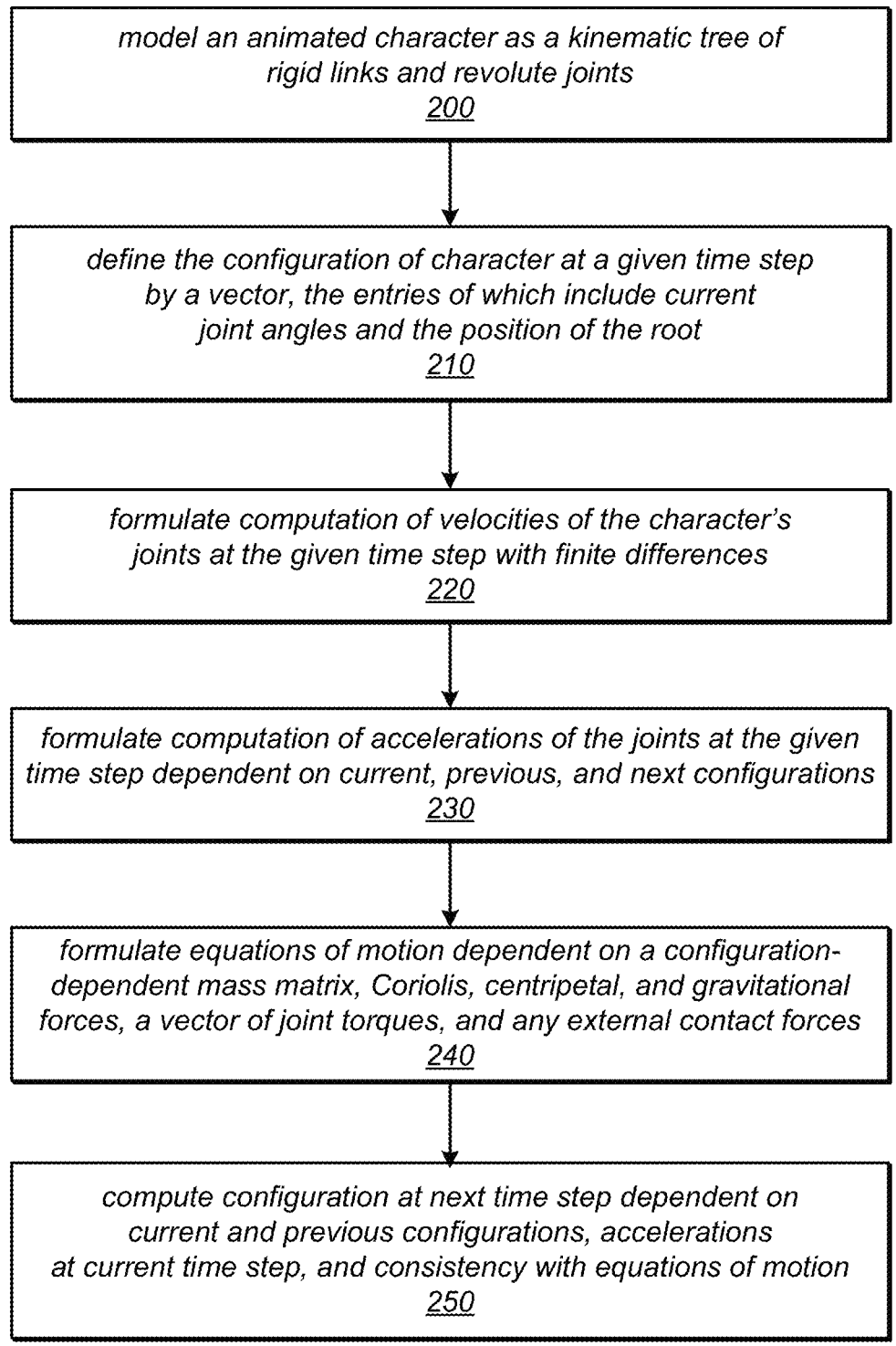
FIG. 2 is a flow diagram illustrating a method for modeling an animated character and its movements, according to some embodiments.

FIG. 2 is a flow diagram illustrating a method for modeling an animated character and its movements, according to some embodiments. In various embodiments, the operations illustrated in FIG. 2 may be implemented in software, in hardware, or in a combination of hardware and software. For example, in some embodiments, they may be performed by one or more modules of an interactive application that provides a character animation feature or by one or more standalone software modules configured to perform these operations. As illustrated in this example and described above, the method may include modeling an animated character as a kinematic tree of rigid links and revolute joints, as in 200. As illustrated at 210, the method may include defining the configuration of the character at a given time step (k) by a vector ($q_k$), the first three entries of which include coordinates defining the position of the root, and each other entry of which includes the current angle of a joint.

As illustrated in FIG. 2 and described above, the method may include formulating a computation of the velocities of the character's joints at the given time step with finite differences, as in 220. The method may also include formulating the computation of the accelerations of the joints at the given time step dependent on the current, previous, and next configurations of the animated character, as in 230. In some embodiments, the method may include formulating the equations of motion that describe the motion of the animated character dependent on a configuration-dependent mass matrix, on Coriolis, centripetal, and gravitational forces, on a vector of joint torques, and/or on any external contact forces, as in 240.

Using the modeling and formulations described above, the configuration of the animated character at the next step may be computed, as in 250, and this computation may be dependent on the current and previous configurations of the animated character, the computed accelerations at the current time step, and consistency with the formulated equations of motion.

The approach employed in various embodiments described herein may be referred to as "quasi-physical simulation" because it does not always respect the constraint that the character's root be unactuated. Actuation of the character's root, sometimes called "hand of God" forces, may be non-physical, but may be essential for tracking an inherently non-physical reference motion, or dealing with excessive perturbations. However, excessive actuation of the root can result in visible visual artifacts, making the character look a bit like a marionette held up with invisible strings. One element of the quasi-physical approach described herein may be the explicit minimization of root actuation, which may result in the non-physical forces being unnoticeable to a casual observer unless very large perturbations are applied.

Since a soft root unactuation constraint may make any acceleration feasible, the systems described herein may in some embodiments impose hard goal constraints on the controller. For example, in some embodiments, to ensure that these constraints are always respected, both control and simulation may be formulated as a single optimization problem. This optimization may be summarized as follows, according to some embodiments:

$$\min_{a_k, \lambda} E_T(a_k, \lambda) + E_p(a_k) + E_e(a_k) \qquad (4)$$

$$s, t, \lambda_i \geq 0$$

$$G(a_k) = 0 \qquad (5)$$

In this example, constraint 5 (shown above) may represent the goal constraint, and constraint 4 may ensure that contact forces lie within their friction cones. The objective of the optimization is the sum of a number of quadratic terms dependent on $a_k$ and $\lambda$. Note that in this example, $\tau$ does not explicitly appear in the optimization, because it can be expressed as a linear function of $a_k$ and $\lambda$ using equation 3.

In some embodiments, constraint 5 may be a linear constraint used to ensure that the horizontal components of the character's center of mass follow a prescribed trajectory. This may be an intuitive constraint in a game or virtual environment, where the game logic may be used to prescribe a character's overall trajectory, while the animation module takes care of animating the character as it traverses this trajectory. Although the goal constraint may not explicitly prevent the character from falling, the limits on undesired horizontal center of mass movement may effectively prevent the lateral motion that is needed to throw the character off balance. It has been found that constraining the vertical motion of the center of mass may in some cases adversely affect the character's freedom of movement under perturbation, while omitting this constraint may not adversely impact robustness.

In some embodiments, such as in the example shown above, the objective may consist of three quadratic terms. In some embodiments, a torque term $E_\tau(a_k,\lambda)$ may seek to minimize non-physical actuation of the root and excessive actuation of other joints, e.g., to avoid very stiff behavior. A pose term $E_p(a_k)$ may track the sequence of reference poses generated by the animation module. Finally, an end-effector term $E_e(a_k)$ may handle joints that are in contact with the environment, as well as joints that will soon be in contact or joints that the reference motion requires to be in contact. In some embodiments, this end-effector term may serve to prevent inter-penetration with the environment, as well as to encourage contacts to be established at the correct time, even under perturbation.

As noted above, the horizontal trajectory of the center of mass may in some embodiments be used as a hard constraint on the synthesized animation, and may allow for intuitive control of the character's gross motion. Using equation 2 above, this constraint may in some embodiments be formulated as the following linear equation:

$$G(a_k) = o_{k+1} - o^*_{k+1}$$

$$= 2o_k - o_{k-1} + \Delta t^2 \ddot{o}_k - o^*_{k+1}$$

$$= 2o_k - o_{k-1} + \Delta t^2 (J_c a_k + \dot{J}_c v_k) - o^*_{k+1} = 0$$

In this example, $o_k$ may represent the character's center of mass at time step k, $O^*_{k+1}$ may represent the desired center of mass at the next time step, and $J_c$ may represent the Jacobian of the horizontal components of the center of mass, which is the mass-weighted sum of the Jacobians of the joints. In some embodiments, $\dot{J}_c v_k$ may be computed as the mass-weighted sum of the accelerations of the joints under zero actuation, which may be obtained as a by-product of the Recursive Newton-Euler algorithm and may sometimes referred to as velocity-product acceleration.

In some embodiments, the torque objective term $E_\tau(a_k,\lambda)$ may serve to both minimize undesired root actuation and to avoid unrealistically large joint torques. Without explicitly minimizing root torques, the optimization may have no reason to avoid non-physically actuating the root, giving the character the appearance of a marionette. In some embodiments, gently minimizing the other torques may help the character appear less rigid under perturbations.

In this example, by solving equation 3 for joint torques, the torque objective may be formulated as follows:

$$E_T(a_k,\lambda) = \|M a_k + C - J_c^T V_c \lambda - \tau^*\|_{w_T}^2$$

In this example, $w_\tau$ may represent a weight vector that may be intuitively thought of as the inverse "strength" of each joint, and $\tau^*$ may represent the vector of desired joint forces. In some embodiments, for non-root joints i, $w_\tau(i)$ may be set to the inverse of the mass that is rooted at that joint. For example, the stance foot may have a weight equal to the inverse of the total mass m, since it must support the whole body, while the weight on the wrist may be the inverse of the hand's mass. The strength of the joints may in some embodiments be specified directly by the user, but an automatic weighting (such as that described above) has been found to be both simple and effective.

To favor actuated joints over non-actuated root joints, the root joints may be weighted higher than the non-actuated joints, in some embodiments. For example, in some embodiments, the system may set $w_\tau(i_u) = 500/m$ for root joints $i_u$. This value has been found to work well for both realistic, motion-captured reference motions, and for non-realistic, stylized animations, in various embodiments. In various embodiments, higher weights may increase realism but decrease the fidelity with which the reference motion can be followed, while lower weights may create faster disturbance rejection at the cost of stiffness and lower realism.

The simplest setting for the desired forces τ* may be 0, which may serve to minimize all joint forces. This may work well for realistic motions, but may produce exaggerated responses to long perturbations. Since muscle activation may change smoothly over time, a biomechanically-inspired alternative may be to minimize the rate of change of actuated joint torques by setting τ* (i) for non-root joints i to the torque at i in the previous frame. The system described herein may in some embodiments further augment the objective by damping the previous torque by a factor of ½, which may help prevent excessively high forces.

For non-physical reference motions, such as cartoon animations, the approach described herein may still fail to follow the motion when the root in the reference motion itself is not unactuated. In this case, the root torques needed to follow the reference motion may be estimated by solving an additional optimization for τ*, as follows:

$$\min_{\tau^*,\lambda} \|\tau^*_{1,\ldots,6}\| \quad (6)$$
$$\text{s.t. } M(q_k^*)a_k^* + C(q_k^*, v_k^*) - J_c^T V_c \lambda = \tau^*$$
$$\lambda_i \geq 0$$
$$\forall_i$$

In this example, $q^*_k$, $v^*_k$ and $a^*_k$ may represent the configuration, velocity, and acceleration in the reference motion (obtained with equations 1 and 2), while the first six entries of τ*, denoted $\tau^*_{1,\ldots,6}$ may represent the root torques. In some embodiments, in order to obtain only the reference torques for the root, the system need only keep the first six rows of the constraint matrix 6, producing a fast and compact optimization. Furthermore, if the reference motion is known in advance, references torques may be pre-computed, removing the need to run this optimization during synthesis. In various embodiments, the reference torques may be used either for the root only, or for all joints. In the latter case, the strength of all the joints may be reduced arbitrarily while still allowing the character to follow the reference motion. This may in some embodiments create more exaggerated responses to perturbations, and may provide an intuitive control for the designer to adjust the magnitude of a character's disturbance reaction.

As noted above, in some embodiments, the pose objective term $E_p(a_k)$ may track the reference motion generated by the animation module. In some embodiments, the method may only require that the animation module provide the $k^{th}$ pose, the previous pose, and the next pose. To track the reference motion, the distance between the current acceleration $a_k$ and a target acceleration computed according to a proportional derivative (PD) control rule may be minimized. The objective term, which consists of the magnitude of the difference between $a_k$ and the PD rule acceleration, may in some embodiments be given by the following:

$$E_p(a_k) = \|a_k - a^*_k - (v^*_k - v_k)\omega_p \zeta_p - (q^*_k - q_k)\omega_p^2\|_{w_p}^2$$

In this example, $\omega_p$ and $\zeta_p$ may determine PD gains, and $w_p$ may represent a joint weights vector consisting of the fraction of the character's mass rooted at each joint. In this example, $q^*_k$, $v^*_k$ and $a^*_k$ may represent the reference configuration, velocity, and acceleration at the current time step, respectively. In some embodiments, the ratio may be set to critical damping, with $\zeta_p = 1$. The frequency $\omega_p$ may control how quickly the character returns to the reference motion. Note that the system is assumed to use $\omega_p = 20$ in all of the examples described herein. In some embodiments, the objective may be weighed against the torque term by multiplying all weights by a constant. For example, this constant is assumed to be 2.5 in all of the examples described herein.

In some embodiments, the reference configuration, velocity, and acceleration may be obtained from the current, next, and previous reference poses directly by using the finite difference equations 1 and 2. However, the system may in some embodiments obtain better results by tracking the joint configurations and velocities in world-space rather than parent-space. For example, when tracking directly in body coordinates, errors from parent joints may propagate to their children, which may produce significant artifacts when joints deep in the kinematic tree (such as the pelvis) deviate from their targets. To track in world-space, joint orientations $q^*_k(i)$, $q^*_{k-1}(i)$ and $q^*_{k+1}(i)$ may be computed for each joint i that causes the world-space orientation of i to match as closely as possible that in the current, previous, and next reference pose, given the world-space orientation of the parent of i in the current configuration $q_k$. In this example, the world-space rotation matrix of the parent of joint i may be denoted with $^{p_i}_0 T_k$, the parent-space rotation of i may be denoted with $^{i}_{p_i}T_k$, and rotations in the reference poses may be denoted with $^{p_i}_0 T^*_k$ and $^{i}_{p_i}T^*_k$. The reference world-space orientation of joint i at frame k may be given by $^{p_i}_0 T^*_k {}^{i}_{p_i}T^*_k$, and may be converted to parent-space in the current configuration by multiplying it by $^{p_i}_0 T_k^{-1}$. The targets for steps k−1 and k+1 may be obtained in the same way, but $^{p_i}_0 T_{k+1}^{-1}$ may not be available. Instead, the parent orientations may be used at step k throughout to obtain the following desired rotations:

$$R^*_{k-1}(i) = {}^{p_i}_0 T_k^{-1} {}^{p_i}_0 T^*_k {}^{i}_{p_i}T^*_{k-1}$$

$$R^*_k(i) = {}^{p_i}_0 T_k^{-1} {}^{p_i}_0 T^*_k {}^{i}_{p_i}T^*_k$$

$$R^*_{k+1}(i) = {}^{p_i}_0 T_k^{-1} {}^{p_i}_0 T^*_k {}^{i}_{p_i}T^*_{k+1}$$

In this example, the desired joint orientation $q^*_k(i)$ may be computed from $R^*_k(i)$ by converting $R^*_k(i)$ into exponential coordinates (also known as an axis-angle representation), and projecting it onto the axis of joint i. By convention, all of the joints may rotate about their z axis, so $q^*_k(i)$ may simply be the z component of the exponential coordinate representation of $R^*_k(i)$.

As noted above, in some embodiments, the end-effector objective term $E_e(a_k)$ may handle joints that are currently in contact with the environment, as well as joints that must soon be in contact with the environment according to the reference motion. Since the character may only exert external forces by contacting the environment, special handling of contacts may ensure that they are established at the right time and that they produce a physically plausible animation. The end-effector objective may in some embodiments be formulated as a PD controller on task-space end effector accelerations as follows:

$$E_e(a_k) = \|a_{e_k} - a^*_{e_k} - (v^*_{e_k} - v_{e_k})\omega_e \zeta_e - (p^*_{e_k} - p_{e_k})\omega_e^2\|_{w_e}^2 = \|\dot{J}_e a_k + J_e v_k - a^*_{e_k} - (v^*_{e_k} - J_e v_k)\omega_e \zeta_e - (p^*_{e_k} - p_{e_k})\omega_e^2\|_{w_e}^2.$$

In this example, $P_{e_k}$, $v_{e_k}$, and $a_{e_k}$ may be used to denote task-space positions, velocities, and accelerations of end-effectors; and $P^*_{e_k}$, $v^*_{e_k}$, and $a^*_{e_k}$ may be used to denote their desired positions, velocities, and accelerations. For joints that are in contact, $\omega_e$ may be set to $\Delta t$, and $\zeta_e$ may be set to ½, which may cause the end-effectors to attempt to reach the target position $P^*_{e_{k+1}} = p^*_{e_k} + \Delta t v^*_{e_k} + \Delta t^2 a^*_{e_k}$ at the next time step. For end-effectors that are not yet in contact, the same ratio may be used and the system may set $\omega_e = 20$ to more loosely track the reference end-effectors.

In some embodiments, for end-effector target positions $p^*_{e_k}$, the system may simply use the task-space positions of the end-effector joints in the reference motion and obtain $v^*_{e_k}$, and $a^*_{e_k}$ using equations 1 and 2. However, on uneven terrain, it may be useful to target end-effector positions that clear obstacles and correctly land on surfaces of uneven height. Therefore, in some embodiments, the system may compute the heights of the end-effectors in the reference motion, and add these heights to the current height of the terrain at the end-effector's current location to obtain height-corrected targets. In some embodiments, the end-effector target may be further improved to allow it to clear steps by checking the height at the position $p_{e_k}+t_f v_{e_k}$ that the end-effector is predicted to occupy a short amount of time $t_f$ in the future. For example, the system may use $t_f=0.1$, or 5 time steps, in some embodiments.

In some embodiments, to ensure that contacts are stiff, the targets for joints that are in contact with the environment may be offset by the difference between the actual and target positions of the joint at the first step at which the contact is created. This may cause the target to "stick" to the position where the contact is created, but may still allow it to slip if the reference motion has slippage.

In some embodiments, while the end-effector is in contact, equations 1 and 2 may be used to obtain $v^*_{e_k}$ and $a^*_{e_k}$. However, when the end-effector is not in contact, its height may change non-smoothly due to abrupt variations in the terrain (such as stairs). To prevent the PD controller from tracking these abrupt variations, the system may in some embodiments use $v^*_{e_k}$ and $a^*_{e_k}$ directly from the reference motion, without the height offset.

Note that a number of factors may affect the weight given to different end-effectors in the weights vector $w_e$. For example, in some embodiments, the system may take into account an estimate of the time until the joint will be in contact in the reference motion, in order to encourage joints to contact the environment at the right time. To prevent joints that should not be in contact from accidentally impacting the environment and causing the character to trip, as well as to prevent contacting joints from penetrating the environment, the system may also take into account the joint's current height. Since inter-penetration and foot height may only be relevant in the direction normal to the supporting surface, this weight may only be applied to the normal direction. When the normal is not vertical, the system may rotate $p_e$, $v_e$, and $a_e$ so that the vertical axis is aligned with this normal and can be weighed separately from the tangent components.

In various embodiments, the tangent weight of an end-effector may be given by $1-t_h/t_m$, where $t_h$ represents the estimated time until the end-effector in the reference motion comes into contact, and $t_m$ represents the maximum time at which the system begins to track the end-effector (e.g., 0.3 in some embodiments). The normal weight may be the sum of the tangent weight and $1-h/h_m$, where h represents the distance from the end effector to the environment (clamped to $h_m$), and $h_m$ represents the maximum height at which the system begins tracking, set to $h_m=20$ cm. As with the pose objective, the end-effector objective may be weighted against the torque term by multiplying all weights by a constant value of 25. A summary of all the weights used in the objectives (in the examples described herein) is provided in Table 1, and the values remain the same in all of these examples.

TABLE 1

Summary of objective weights.

| Weights | | PD gains | |
|---|---|---|---|
| $w_\tau (i_u)$ | 500 m$^{-1}$ | | |
| $w_\tau (i_u)$ | $m_r(i)^{-1}$ | | |
| $w_p (i_q)$ | 2.5 $m_r(i)$ | $\omega_p = 20$ | $\varsigma_p = 1$ |
| $w_e (j_e)$ | 25 | $\omega_e = 20$ | $\varsigma_e = \frac{1}{2}$ |
| $w_e (j_c)$ | 25 | $\omega_e = \Delta t$ | $\varsigma_e = \frac{1}{2}$ |

As illustrated in Table 1, in the examples described herein, unactuated joints are indexed with $i_u$, actuated joints are indexed with $i_a$, and all joints are indexed with $i_q$. In this example, end effectors not in contact with the environment are indexed with $j_e$, while end effectors in contact with the environment are indexed with $j_c$. In this example, $m_r(i)$ gives the mass rooted at joint i.

Figure 3:
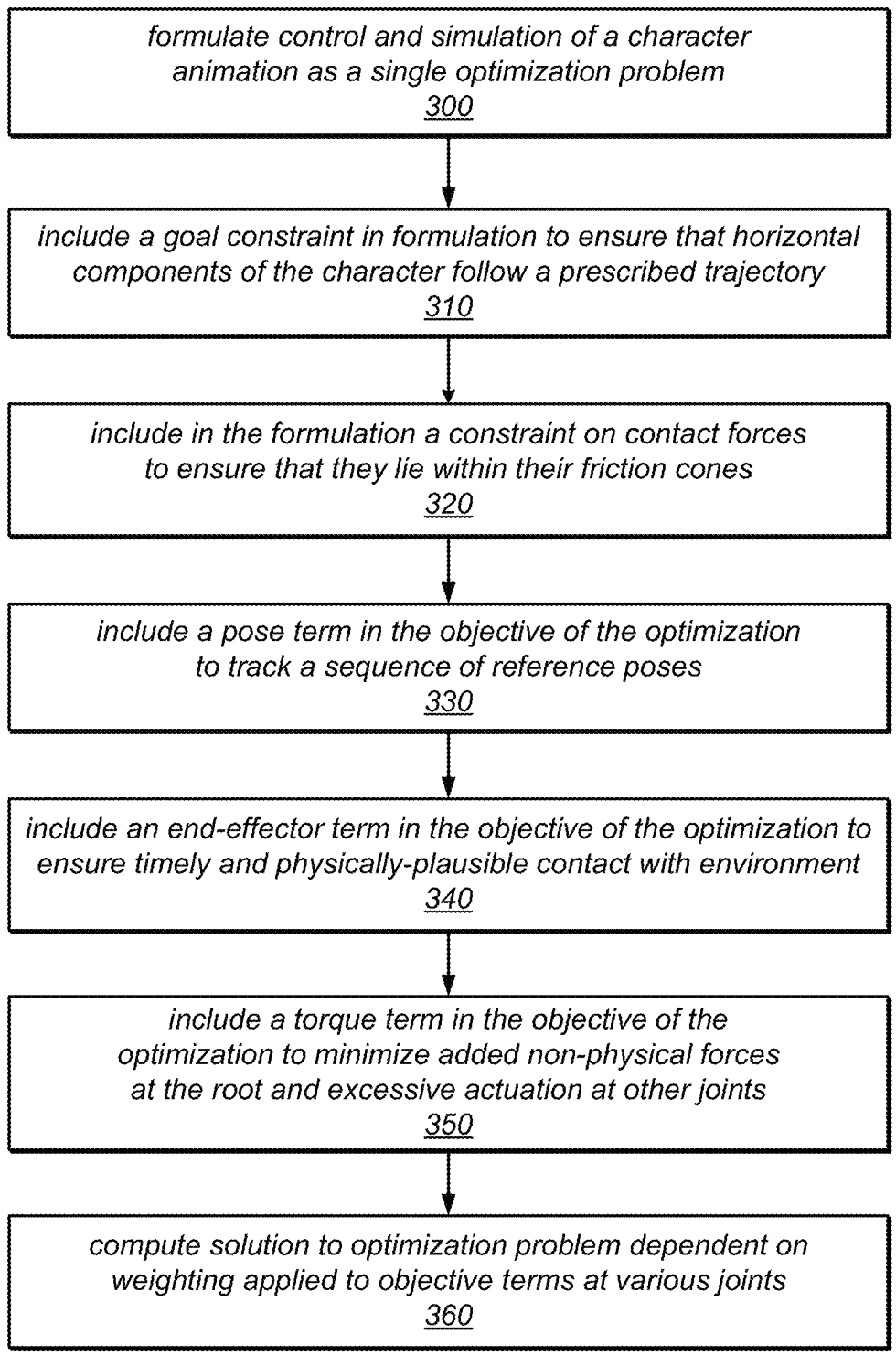
FIG. 3 is a flow diagram illustrating a method for performing a quasi-physical simulation of an animated character, according to some embodiments.

FIG. 3 is a flow diagram illustrating a method for performing a quasi-physical simulation of an animated character, according to some embodiments. As described herein, a quasi-physical simulation may be used to solve for the configuration of an animated character at a given time step by optimizing the equations above. In various embodiments, the operations illustrated in FIG. 3 may be implemented in software, in hardware, or in a combination of hardware and software. For example, in some embodiments, they may be performed by one or more modules of an interactive application that provides a character animation feature or by one or more standalone software modules configured to perform these operations. As illustrated at 300, in this example, the method may include formulating the control and simulation aspects of a character animation as a single optimization problem. The formulation of the simulation may include a goal constraint to ensure that horizontal components of the character (e.g., the character's root, center of mass, joint or group of joints) follow a prescribed trajectory, as in 310. As noted above, in some embodiments, the center of mass of the character may be designated as a goal-constrained component of the character, for the purposes of an animation simulation. Also note that the trajectory may be obtained from any one of a variety of sources, e.g., user input, an animation replay module, or a parameterized animation module, in different embodiments.

As illustrated in this example and described above, the formulation of the simulation may include a constraint on contact forces to ensure that they lie within their friction cones, as in 320. In various embodiments, the formulation of the objective of the optimization may include a pose term to track a sequence of reference poses (e.g., reference poses generated by animation module), as in 330, and an end-effector term to ensure timely and physically-plausible contact with environment, as in 340. As described herein, the formulation of the objective of the optimization may also include a torque term that serves to minimize any added non-physical forces at the root and/or any excessive actuation at other joints, as in 350. For example, in situations in which the configuration of the character can meet its goal objective using only physical forces, this term may cause the simulation to avoid adding any unnecessary non-physical forces.

Once the quasi-physical simulation has been formulated using the terms described above, the method may include computing a solution to this optimization problem dependent on a weighting applied to each of the objective terms, as in 360. In some embodiments, the weighting of the objective terms may be different for different joints. This is shown in the example table of objective weights above. In other embodiments, the weighting of the objective terms may be different for different characters (e.g., for cartoon or super-human characters vs. more realistic human characters) and/or they may be adjusted to achieve a desired effect or stylized motion. For example, the weight on the torque term may be increased or decreased to vary the degree of physical realism.

The quasi-physical simulation described in the preceding paragraph may provide the character with physically plausible responses to disturbances. However, these responses may appear "unconscious" and may not exhibit the intelligent reactions that are associated with human motion, since the quasi-physical simulation only attempts to follow a reference motion. In some embodiments, in order to apply a quasi-physical simulation in a more realistic use case, the system may employ (and/or develop) an animation module that provides appropriate reference motions. For example, a parameterized animation module for the space of walking and running motions that responds believably to changes in character velocity is described below. This animation module may accept as input any number of motion clips exhibit walking or running in any direction. At runtime, the animation module may blend these clips to produce a reasonable guess for a walk or run in any desired direction and at any speed.

To develop the animation module, the space of walks and runs may be parameterized by the character's velocity in the sagittal and coronal planes, denoted $v_x$ and $v_z$, as well as by the percentage of the current gait cycle that has been completed, denoted $\phi$. In some embodiments, $\phi$ may be subdivided into four parts, one for each phase of walking or running. For example, the left foot single-support phase may cover $\phi \in [0, \frac{1}{4})$, the following double-support or flight phase may cover $\phi \in [\frac{1}{4}, \frac{1}{2})$, the right foot single-support phase may cover $\phi \in [\frac{1}{2}, \frac{3}{4})$, and the final double-support or flight phase may cover $\phi \in [\frac{3}{4}, 1)$. Within each phase, $\phi$ may be parameterized by the elapsed fraction of the total center of mass displacement during the phase. For example, when the character is left foot single-support and has traveled half the total distance during this phase, $\phi$ may be equal to $\frac{1}{8}$.

To associate a pose with each point in the space spanned by these three parameters, the animation module may in some embodiments blend between the available example motions. The module may automatically process the motions to segment them into phases, and to associate a $(\phi, v_x, v_z)$ point with each frame. To compute an estimate for the pose at a desired parameter value point $(\phi^*, v^*_x, v^*_z)$ the module may first collect a frame from each reference segment for the current phase, e.g., the poses with the nearest $\phi$ values in each reference segment. This may provide a collection of poses $\{q^{(1)}, \ldots, q^{(n)}\}$ with corresponding parameters $\{(\phi^{(1)}, v_x^{(1)}, v_z^{(1)}), \ldots, (\phi^{(n)}, v_x^{(n)}, v_z^{(n)})\}$, where $\phi^{(i)} = \phi_k^*$ for all i. The module may then construct an estimate for the pose $q_k^*$ at $(\phi^*, v^*_x, v^*_z)_k$ by blending the collected poses with weights given by a Gaussian weighting function. To prevent foot-skate, each pose may be rooted at the supporting foot before blending, in some embodiments.

In some embodiments, the animation module may store poses with root position and orientation stored relative to the previous frame, so that the global position and orientation of a new frame may be easily computed from the previous one. However, this blending method may not necessarily produce a pose whose offset from the previous frame creates the desired velocity $(v^*_x, v^*_z)$. To ensure that the desired velocity is achieved, the animation module may in some embodiments apply the goal constraints on the quasi-physical simulation by setting the desired center of mass position equal to the previous position plus the $(v^*_x \Delta t, v^*_z \Delta t)$. Depending on the desired behavior, a fraction of the external disturbance forces may also be added to $(v^*_x, v^*_z)$ to perturb the character.

In addition to determining a pose for the current frame, the animation module may in some embodiments also determine parameter values $(\phi^*, v^*_x, v^*_z)_{k+1}$ for the next frame. Since center of mass velocities may change over the course of a single reference segment, the system may need to capture this variation. Therefore, in some embodiments, the system may compute the derivatives of the parameters for each frame in the reference clips, denoted $(\dot{\phi}^*, \dot{v}^*_x, \dot{v}^*_z)$, with finite differences. When blending poses to determine $q^*_k$, the module may also blend together the derivatives of their associated parameter values to obtain $(\dot{\phi}^*, \dot{v}^*_x, \dot{v}^*_z)_k$, which may then be used to compute $(\phi^*, v^*_x, v^*_z)_{k+1}$. Note that in some embodiments, the term $\dot{\phi}$ may require special handling in the case that the velocity of the blended pose is far from the desired velocity $(v^*_x, v^*_z)$, such as when the desired parameter value lies outside of the convex hull of the reference poses. To account for a mismatch between the desired values $(v^*_x, v^*_z)$ and the actual values $(v_x, v_z)$, the module may in some embodiments multiply $\dot{\phi}^*$ by the ratio of their magnitudes. For example, when synthesizing a pose that moves twice as fast as the nearest reference motion, this would double $\dot{\phi}^*$, effectively doubling the motion's playback rate and bringing it to the desired velocity.

The animation module described herein may in some embodiments also provide the application with control over the character's velocity and direction. In some embodiments, this may be accomplished using a PD servo in parameter space, which may gradually drive the parameters to the desired set point while still allowing for minor deviations to replicate the stylistic velocity variation in the reference motions. In some embodiments, turning may be accomplished by simply rotating the current pose. Since the blending roots all poses on the stance foot, this may produce the effect of the character rotating on the current support, and the quasi-physical simulation may take care of any deviations in position. The system may also use the end-effector targets in the simulation to prevent the stance foot itself from pivoting during a turn, in some embodiments.

Figure 4:
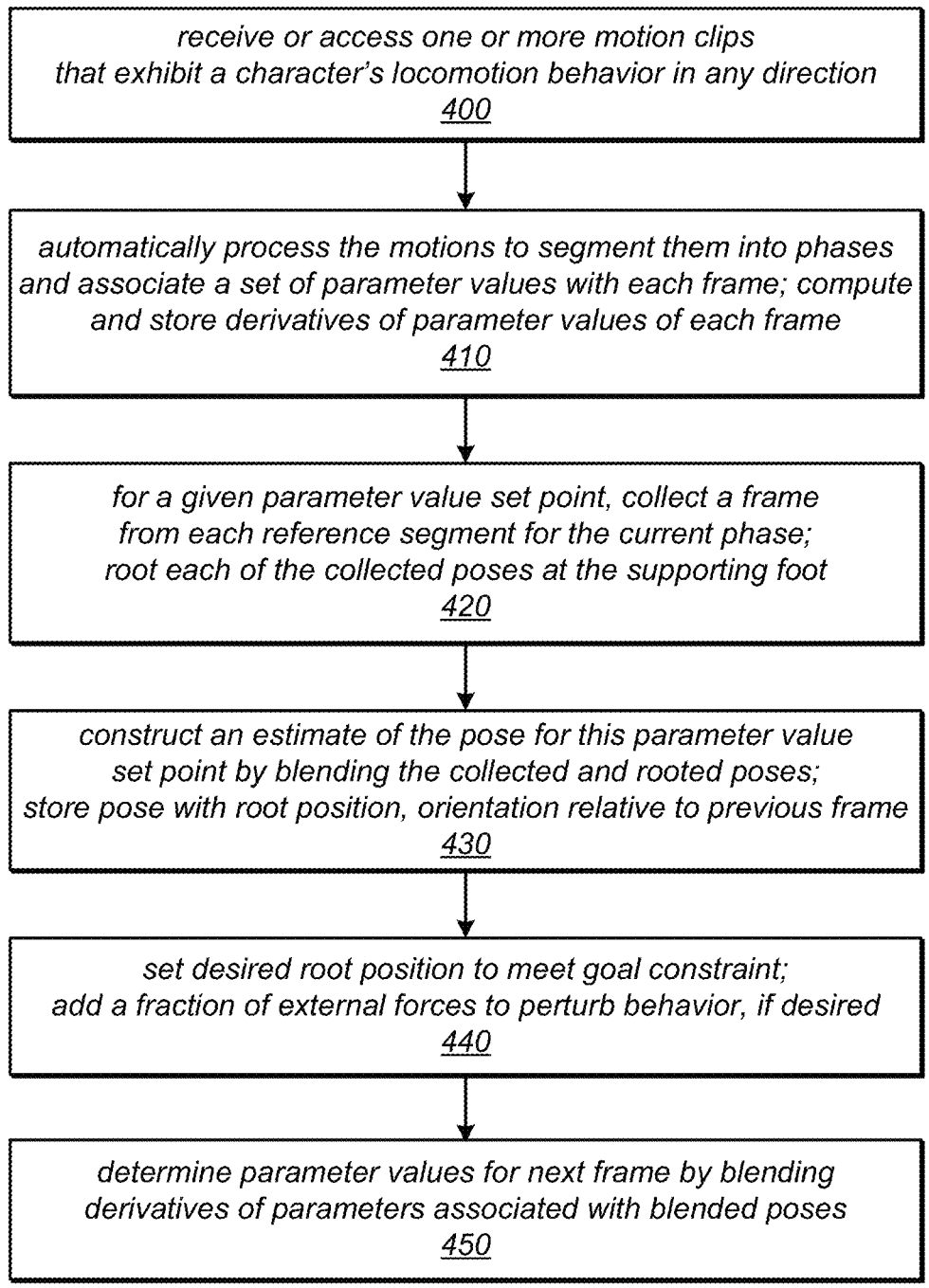
FIG. 4 is a flow diagram illustrating a method for using a parameterized animation module in a character animation, according to some embodiments.

FIG. 4 is a flow diagram illustrating a method for using a parameterized animation module in a character animation, according to some embodiments. In various embodiments, the operations illustrated in FIG. 4 may be implemented in software, in hardware, or in a combination of hardware and software. For example, in some embodiments, they may be performed by one or more modules of an interactive application that provides a character animation feature or by one or more standalone software modules configured to perform these operations. As illustrated in FIG. 4 and described herein, the method may include receiving or accessing one or more motion clips that exhibit a character's locomotion behavior (e.g., walking, running, jumping, crawling, cart wheeling, etc.) in any direction, as in 400.

In some embodiments, the method may include automatically processing the motions exhibited in the clips to segment them into phases, and to associate a set of parameter values with each frame of each clip, as in 410. For example, each motion in the clips may be segmented into a left foot single-support phase, a double-support or flight phase, a right foot single-support phase, and a final double-support or flight phase. In addition, a $(\phi, v_x, v_z)$ point may be associated with each frame in the clips, i.e. each animation frame may be associated with a parameter value set representing the character's velocity in the sagittal and coronal planes, and the completion percentage of the current gait cycle. As illustrated in FIG. 4, the method may also include computing and storing the derivatives of the parameter values of each frame.

As illustrated in FIG. 4, the method may include, for a given parameter value set point, collecting a frame from each reference segment for the current phase, as in 420. For example, in one embodiment, the method may include collecting the two poses in each reference segment with the phase completion values (φ) nearest to the phase completion value of the given point. In some embodiments, each of the collected poses may be rooted at the supporting foot. As illustrated in this example, the method may include constructing an estimate of the pose for this parameter value set point by blending the collected and rooted poses using weights given by a Gaussian weighting function, as in 430. The estimated pose may be stored along with information about the root position and orientation relative to the previous frame.

As illustrated at 440 in FIG. 4 and described above, in some embodiments the method may include setting the desired root position to meet the goal constraint and/or adding a fraction of the external forces to perturb behavior, if desired. In addition to determining a pose for the current time step (i.e. frame), the method may also include determining parameter values for the next frame by blending the derivatives of the parameters associated with the poses blended together, as in 450.

Figure 5:
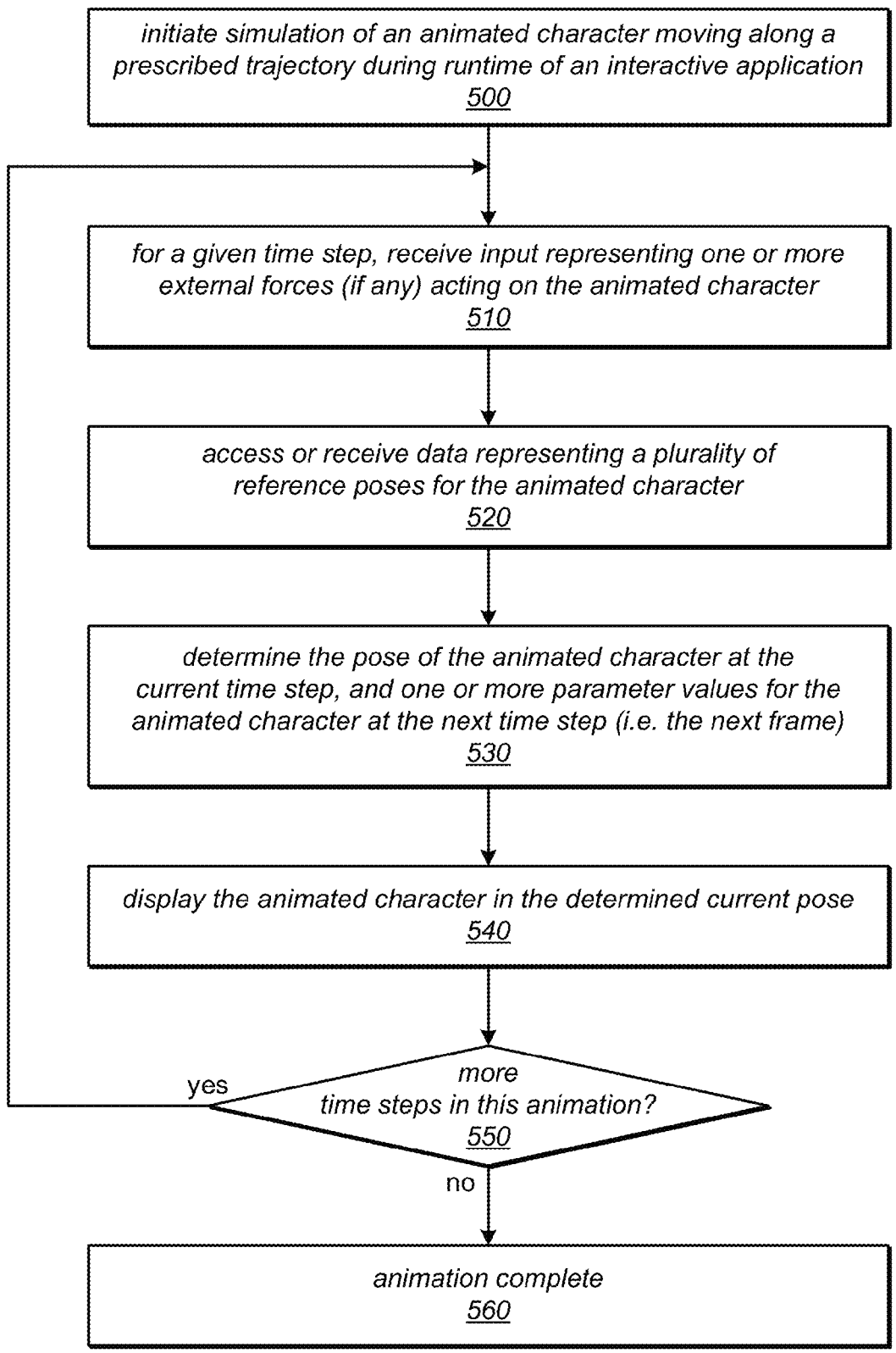
FIG. 5 is a flow diagram illustrating a method for performing character animation using a quasi-physical simulation and a parameterized animation module, according to some embodiments.

FIG. 5 is a flow diagram illustrating a method for performing character animation using a quasi-physical simulation and a parameterized animation module, according to some embodiments. In various embodiments, the operations illustrated in FIG. 5 may be implemented in software, in hardware, or in a combination of hardware and software. For example, in some embodiments, they may be performed by one or more modules of an interactive application that provides a character animation feature or by one or more standalone software modules configured to perform these operations. As illustrated at 500 and described herein, the method may include initiating simulation of an animated character moving along a prescribed trajectory during runtime of an interactive application. For example, the trajectory may define a path to be followed by the designated goal-constrained component of the character (e.g., its center of mass, a joint, or a group of joints), as described herein. In some embodiments, this trajectory may be defined by a user moving a cursor along a path to be taken by an animated character in an interactive game (e.g., using a mouse, joy stick, track ball, touch pad, keyboard, or other cursor control device). In this example, the character may initially follow its prescribed trajectory without having any external forces acting upon it, and a quasi-physical simulation (such as that described herein) may produce animation results similar to those in a system that uses a playback mechanism.

As illustrated at 510, the method may include receiving input representing one or more external forces acting on the animated character at a given time step. For example, the method may consider the application of Coriolis, centripetal, and/or gravitational forces upon the animated character, as well as various contact forces and joint forces. As illustrated at 520, the method may include accessing data representing a plurality of reference poses for the animated character (e.g., from a database of such reference poses) or receiving data representing a plurality of reference poses. For example, the reference poses may be obtained from a parameterized animation module configured to provide appropriate references poses, or using another type of kinematic animation method, such as move trees, motion graphs, real-time motion capture, etc.

As described above and illustrated in FIG. 5, the method may include determining the pose of the animated character at the current time step, dependent on these and other inputs, as in 530. As shown at 530, the method may also include determining and one or more parameter values for the animated character at the next time step (i.e. the next frame). As described herein, the character may be constrained to follow the prescribed trajectory, and the method may apply the quasi-physical simulation and optimization techniques described herein to ensure that this constraint is met even if a strictly physical simulation (i.e. a simulation of physical forces only) is not able to meet this goal constraint while reacting to the external forces. For example, in cases in which a physical simulation would not meet the goal constraint, the quasi-physical simulator may be configured to add non-physical forces to ensure that the goal constraint is met.

Once the current pose has been determined, the method may include displaying the animated character in the determined current pose, as in 540. If there are more time steps to be taken in the animation of the character, shown as the positive exit from 550, the method may include repeating the operations illustrated at 510-540 for each of the additional time steps. This is illustrated in FIG. 5 as the feedback from 550 to 510. If there are no more time steps to be taken, shown as the negative exit from 550, the animation may be complete, as in 560.

Example animations have been produced using embodiments of the animation module and quasi-physical simulation described herein. This approach has been demonstrated on several distinct characters, including human motion-captured animations from the Carnegie Mellon University (CMU) Motion Capture Database, the Ohio State ACCAD Motion Capture Lab, and University of Washington Motion Capture Lab, as well as keyframed cartoon animations of a human-like character, a dog, and a dinosaur. The implementation ran in real time at 50 Hz on a 2.77 GHz dual core machine. Examples of some of the performance measurements collected are shown in Table 2 below.

In these demonstrations, multiple reference clips were used in the animation for each character. Some of the demonstrations produced an animation using a quasi-physical simulation with reference poses obtained directly from the reference clips, without an animation module. Other animations were produced using the animation module. In some of the demonstrations, external forces were applied to the animated characters. For example, short 4000 N perturbations were applied at the shoulder or hand, in some cases.

Figure 6A:
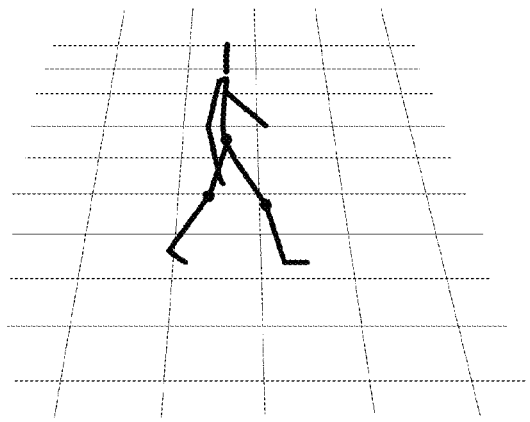
FIGS. 6A-6D depict various character animations using a quasi-physical simulation and reference clips, according to some embodiments.
Figure 6B:
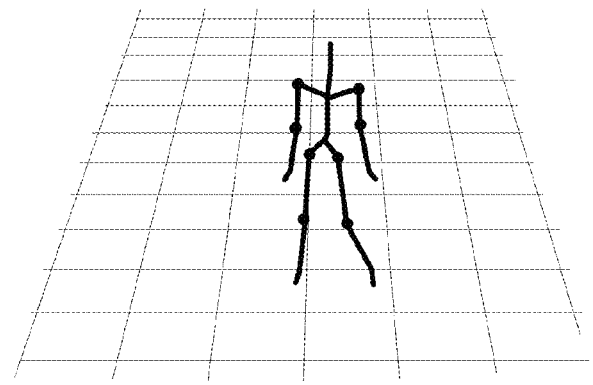
Figure 6C:
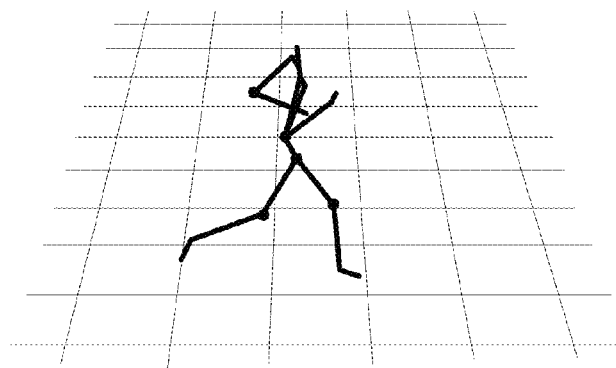

FIGS. 6A-6D depict various character animations using a quasi-physical simulation and reference clips (such as the ones described above), according to some embodiments. Specifically, these figures depict character animations that employ reference clips, but do not employ a parameterized animation module, such as that described herein. In other words, in these examples, the quasi-physical simulation may follow reference poses obtained directly from a motion clip. For example, FIG. 6A depicts a skeleton character (similar to one in the CMU database described above) walking without any disturbances perturbing the character as it follows its prescribed trajectory. In this example, a quasi-physical simulation may follow reference poses obtained directly from a walking clip and may produce results similar to those seen in animation systems that use an animation playback technique. Similarly, FIG. 6B depicts the skeleton character taking a side step without any disturbances. In this example, a quasi-physical simulation may follow reference poses obtained directly from a different walking clip and may also produce results similar to those seen in animation systems that use an animation playback technique. FIG. 6C depicts the skeleton character running, again without any disturbances, and again a quasi-physical simulation may follow reference poses obtained directly from a running clip and may produce results similar to those seen in animation systems that use an animation playback technique.

Figure 6D:
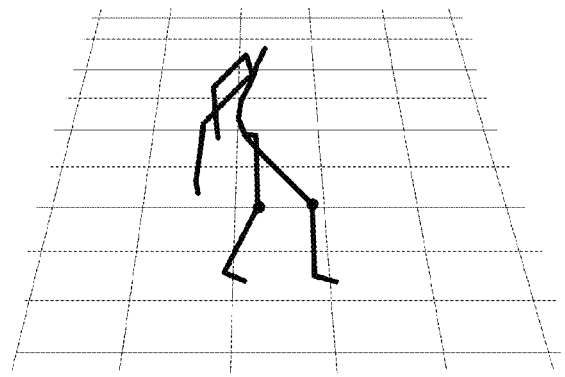

FIG. 6D depicts the skeleton character walking and reacting to a disturbance (e.g., a push). Again, in this example, a quasi-physical simulation may follow reference poses obtained directly from a walking clip. In this case, the quasi-physical simulation may produce an animation that exhibits an unconscious physical response to the disturbance, as described above.

A similar experiment was then demonstrated that used reference poses coming from the animation module. This produced both the "unconscious" physical responses produced in the previous test, as well as "conscious" responses (such as protective steps), which were supplied by the animation module when it detected a change in velocity. The demonstration included an animation of each character traversing a variety of terrain types, including slopes of up to 35 degrees, steps of up to 50 cm in height, and random rough terrain. Since the animation module was not aware of these terrain variations, all responses to changing slope or steps were produced by the quasi-physical simulation. These responses were primarily the result of the end-effector objective $E_e(a_k)$, which modifies the target positions for the feet in response to changing terrain height. On each terrain, 4000 N perturbations were also demonstrated.

In these example animations, smaller continuous perturbations made by pulling the character on the hand with 1000 N were demonstrated, as was a stress test consisting of long 4000 N perturbations. The pulling test demonstrated that the animation module can produce realistic responses by detecting velocity changes and providing velocity-appropriate motion, such as side steps or backpedaling. The stress test demonstrated both the robustness of the character and the sorts of artifacts that may occur in quasi-physical simulation. As discussed herein, large perturbations may cause large non-physical torques on the root, and may manifest themselves as "marionette-like" behavior. This behavior may in some cases be needed to satisfy the goal constraints, but because the character quickly returns to a balanced state, these artifacts may be short-lived. In many applications, such artifacts may be preferable to the failures that would otherwise occur in systems that employ physical controllers.

Figure 7A:
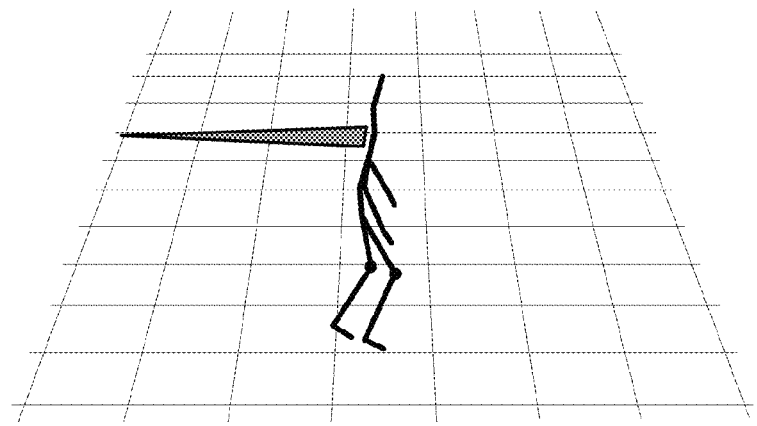
FIGS. 7A-7J depict various character animations using a quasi-physical simulation and an animation module, according to some embodiments.

FIGS. 7A-7J depict various character animations using a quasi-physical simulation and an animation module, according to some embodiments. More specifically, these figures depict animations produced by a quasi-physical simulation in which the reference poses are provided by an animation module. In some of these examples, the motion of the character is perturbed by various external forces, and a quasi-physical simulation is used to determine the reaction to these external forces. Note that in these figures, some of the external disturbances are represented as gray triangles, and the direction and velocity of the goal constraint (i.e. the character's prescribed trajectory) at the current point is represented by an arrow. For example, FIG. 7A depicts a skeleton character (e.g., a skeleton character similar to one in the CMU database described above) walking and reacting to a disturbance (a backward pull). In response to the disturbance, the character straightens up from its normal walking position.

Figure 7B:
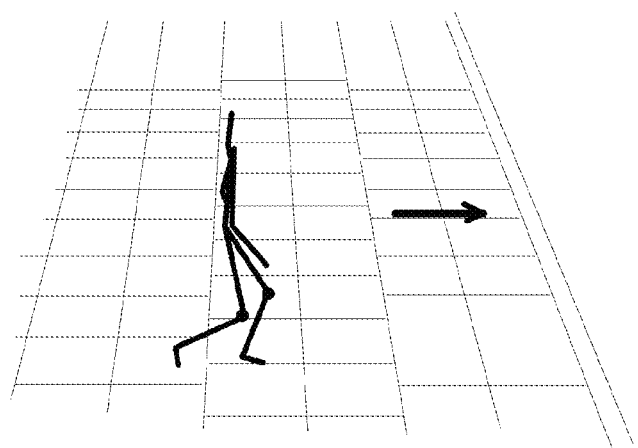
Figure 7C:
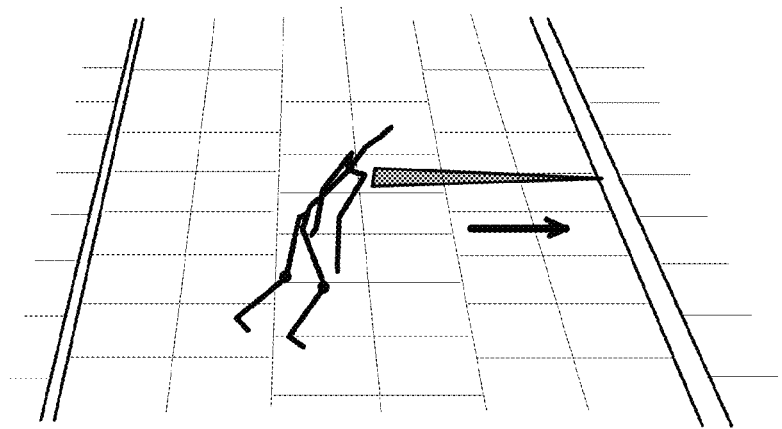

FIG. 7B depicts the skeleton character walking on steps, which apply external contact forces on the character. No additional external disturbances act on the character, in this example. In response to the character coming in contact with the steps, the positions of the character's feet are modified (with respect to their positions when walking on flat ground) in the current pose. FIG. 7C depicts the skeleton character walking on steps and reacting to a disturbance (a pull forward). In this example, in response to the disturbance and the contact forces applied by the steps, the character is tilted forward, and the positions of its feet are modified (with respect to walking on flat ground).

Figure 7D:
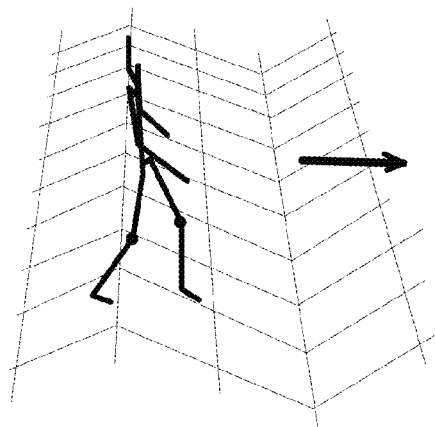
Figure 7E:
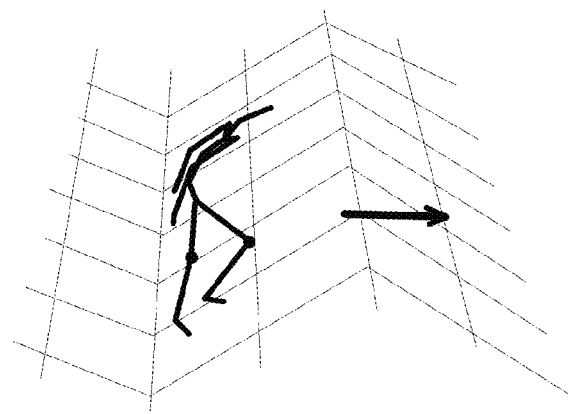
Figure 7F:
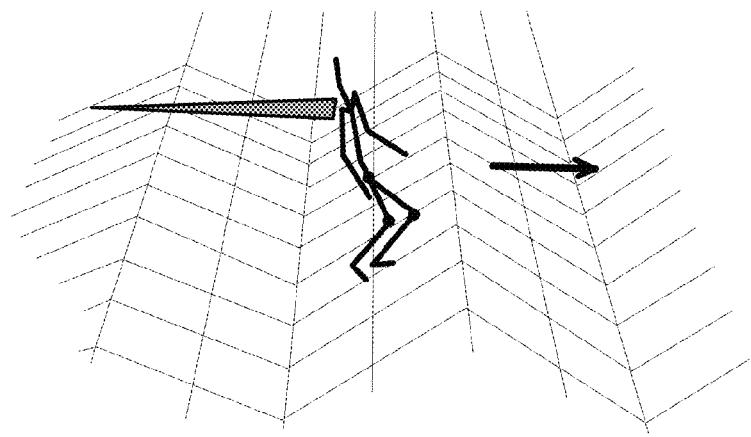
Figure 7G:
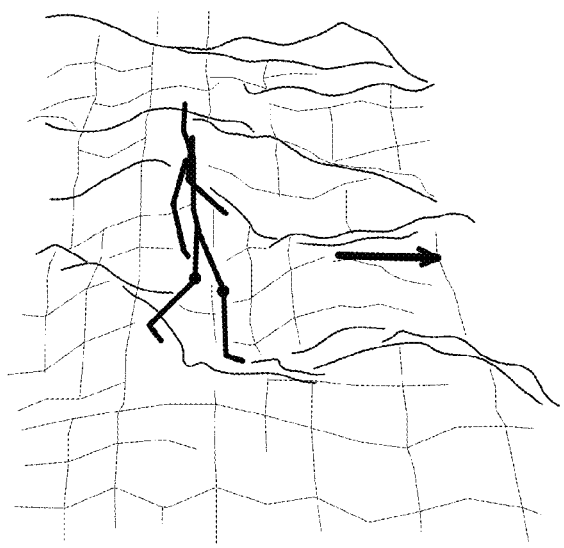

FIGS. 7D and 7E depict the skeleton character walking on sloped ground, which applies external contact forces on the character. No additional external disturbances act on the character, in these examples. In response to the character coming in contact with the sloped ground, the positions of the character's feet are modified (with respect to their positions when walking on flat ground) in the poses depicted in each of these figures. FIG. 7F depicts the skeleton character walking on sloped ground and reacting to a disturbance (a pull backward). In this example, in response to the disturbance and the contact forces applied by the sloped ground, the character is tilted backward, and the positions of its feet are modified (with respect to walking on flat ground).

Figure 7H:
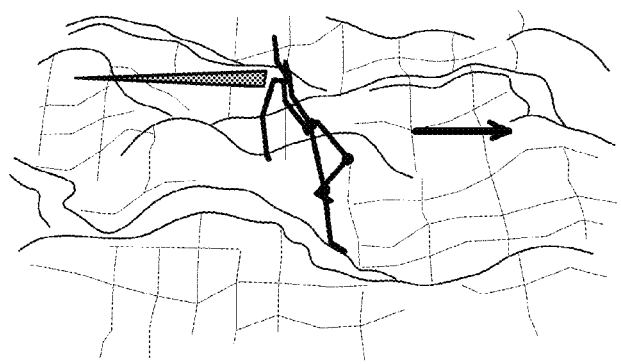
Figure 7I:
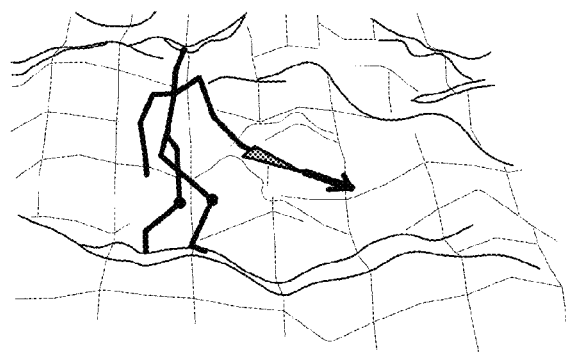
Figure 7J:
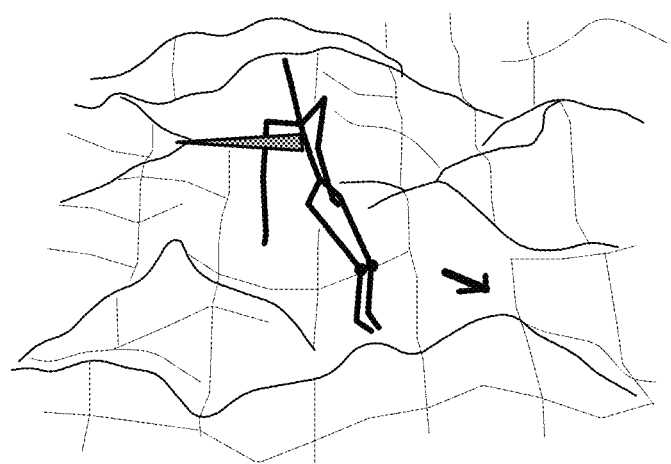

7G depicts the skeleton character walking on a rough ground, which applies external contact forces on the character. No additional external disturbances act on the character, in this example. In response to the character coming in contact with the rough ground, the positions of the character's feet are modified (with respect to their positions when walking on flat ground) in the current pose. FIG. 7H depicts the skeleton character walking on rough ground and reacting to a disturbance (a pull backward). In this example, in response to the disturbance and the contact forces applied by the rough ground, the character leans backward, and the positions of its feet are modified (with respect to their positions when walking on flat ground). FIG. 7I depicts the skeleton character walking on rough ground and reacting to a disturbance (being pulled by the hand). In this example, in response to the disturbance and the contact forces applied by the rough ground, the character is turned slightly to its right, and the positions of its feet are modified (with respect to their positions when walking on flat ground). Finally, FIG. 7J depicts the skeleton character walking on rough ground, while being subjected to a stress test, as described above. In this example, in response to the disturbance and the contact forces applied by the rough ground, the character is pulled backward and turned slightly, and the positions of its feet are modified (with respect to their positions when walking on flat ground).

The example animations produced using embodiments of the animation module and quasi-physical simulation described herein also showed each character animated with each of three possible settings for the desired torque values $\tau^*$ discussed above. In these examples, the appearance of the physically consistent, motion capture driven "CMU" skeleton character was very similar under all three types of reference torques, since the reference motion did not require significant actuation of the root and the muscle activations are smooth. The cartoon dinosaur character, on the other hand, did not accurately follow the reference motion when the desired torques were set to 0, because the animator-created motions were not physically consistent, and significant root actuation was required to follow them. On the other hand, the difference between using reference torques for all joints or only for the root was negligible, suggesting that the simplified 6-row version of constraint 6 in the reference torque optimization may in some embodiments be sufficient.

Figure 8A:
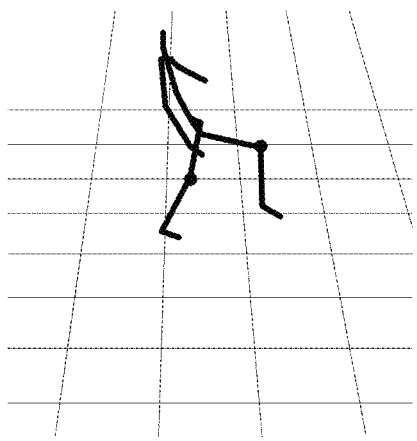
FIGS. 8A-8C depict the effects of different types of reference torques on a character animation, according to some embodiments.
Figure 8B:
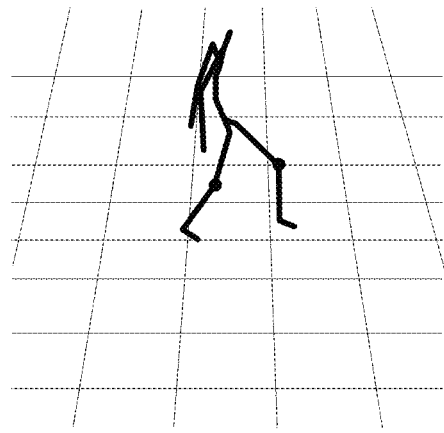
Figure 8C:
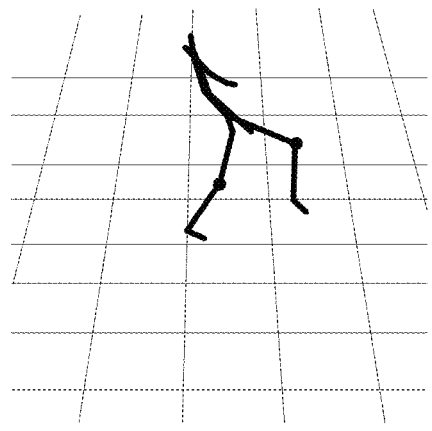

FIGS. 8A-8C depict the effects of different types of reference torques on a character animation, according to some embodiments. For example, FIG. 8A depicts a skeleton character (e.g., a skeleton character similar to one in the CMU database described above) walking and reacting to a disturbance (e.g. a push backward) when reference torques are used only for the root of the character. FIG. 8B depicts the skeleton character walking and reacting to the same disturbance (e.g. a push backward) when reference torques are used for all joints. FIG. 8C depicts the skeleton character walking and reacting to the same disturbance (e.g. a push backward) when no reference torques are used. As described above, the resulting pose of the skeleton character does not vary greatly between in these three cases, while similar experiments using other animated characters yielded much different results when reference torques were applied than when reference torques were not applied.

Partial performance results for the demonstrations described above are presented in Table 2 below. For each character, the table includes the average simulation time per frame using each of the three desired torque settings, as well as the additional time needed for online computation of the reference torques. As discussed above, reference torques may in some embodiments be pre-computed, but computing them online may not be expensive. For each desired torque setting, the table also includes results with and without the use of friction cones, with the latter mode allowing any force to be exerted at the contacts. Since constraint 4 may only be required in order to use friction cones and may be the only inequality constraint in the optimization, it may be dropped to turn the optimization into a linear system, replacing frictional contacts with "fixed" contacts that can exert any force. The result of switching to "fixed" contacts was also evaluated in the demonstrations for each character, and produced less pronounced responses to perturbations, in exchange for a small improvement in performance.

TABLE 2

| contact | desired torque | "CMU" skeleton character | | dinosaur character | |
| --- | --- | --- | --- | --- | --- |
| | | simul. time | torque adder | simul. time | torque adder |
| friction | zero | 24.3 ms | 0.0 ms | 33.6 ms | 0.0 ms |
| | root only | 28.3 ms | 3.6 ms | 36.4 ms | 4.2 ms |
| | all joints | 25.4 ms | 5.2 ms | 34.8 ms | 6.4 ms |
| fixed | zero | 21.3 ms | 0.0 ms | 29.7 ms | 0.0 ms |
| | root only | 25.6 ms | 3.3 ms | 32.5 ms | 3.8 ms |
| | all joints | 21.3 ms | 4.2 ms | 30.8 ms | 5.4 ms |

Table 2 illustrates the average time per animation frame under various desired torque and contact modes for a 50 Hz simulation. The torque column indicates the average time of the reference torque optimization (equation 6).

The methods described herein for animating characters under disturbances may provide guarantees on robustness and may handle non-physical reference motions, such as cartoon or super-human animation. The methods may produce physically plausible responses to disturbance forces and rough terrain. Even when the disturbances become very large, goal constraints on center of mass motion may always be satisfied, although the character may appear non-physical due to the addition of non-physical forces, when they are needed to satisfy the constraints.

Although the center of mass goal constraints used in the systems described herein may provide an intuitive interface with which an application can describe the desired high-level behavior of the character, the methods described herein may easily admit any goal constraint that can be formulated as a linear function of joint accelerations and contact forces. For example, in various embodiments, an application might choose to constrain the position of a single joint to produce "physically plausible 1K," or to exclude some joints from the center of mass computation to allow them to swing freely.

In some embodiments, quasi-physical simulation may be coupled with a standard rigid body simulation engine. Note that one-way coupling may in some embodiments be accomplished by applying external forces. When the inequality constraints on the contact forces are excluded, two-way coupling may also be achieved by expressing the quasi-physical simulation as a linear system and integrating this system into a rigid body solver. However, when inequality constraints are used, the rigid body solver itself must operate inside the quadratic programming solver, which may prove challenging.

The methods described herein may in some embodiments effectively substitute a temporary visual artifact, in the form of non-physical behavior, for controller failure, which may occur when using physical controllers under large disturbances. For applications such as games, temporary non-physical behavior may be preferable to failure, which might result in the character falling to the ground. In other words, temporary non-physical behavior may not severely disrupt the user experience and may produce only a visual artifact, while controller failure may qualitatively change the user's experience. By providing an application designer with guarantees on the character's center of mass motion, the methods described herein may prove sufficiently reliable for widespread use in interactive applications that have so far been reluctant to adopt physical simulation for animated characters.

Example Implementations

Figure 9:
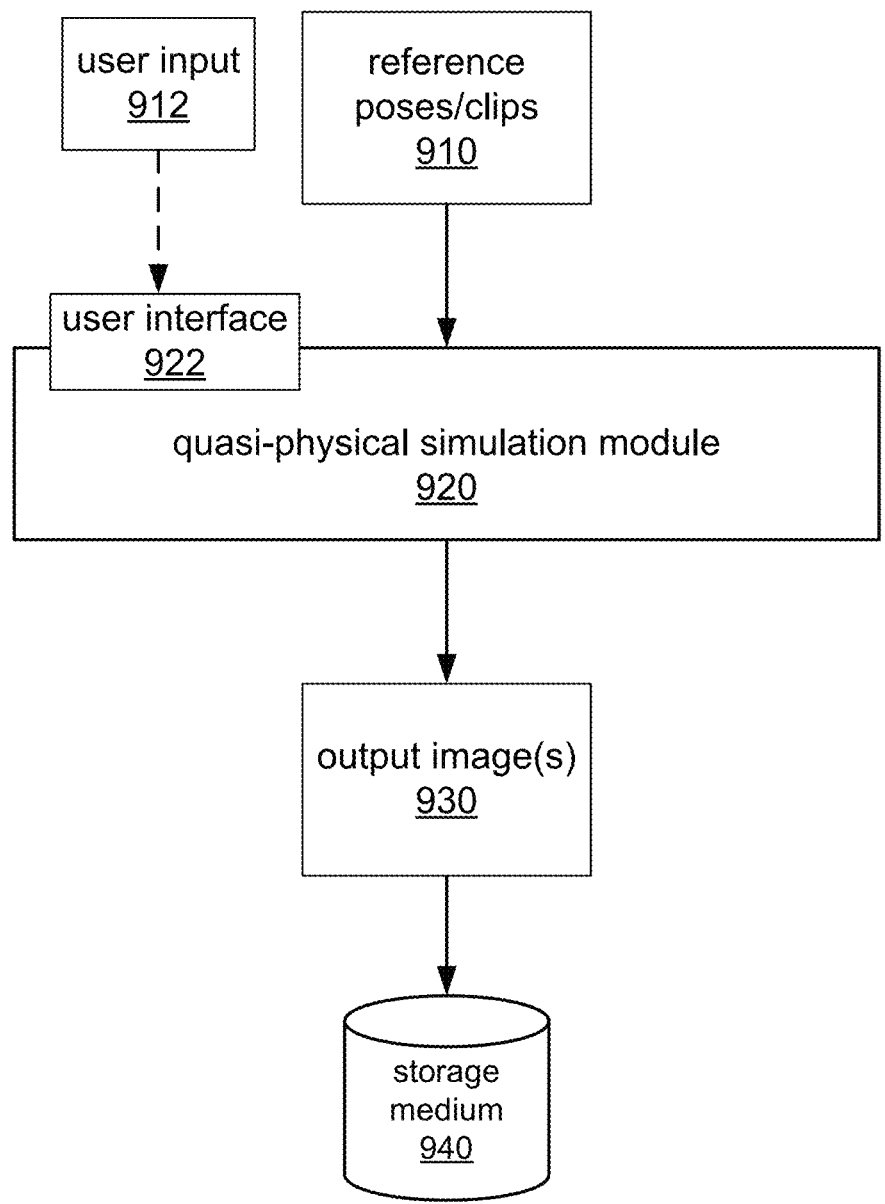
FIG. 9 illustrates a quasi-physical simulation module that may implement robust physically-plausible character animation, according to some embodiments.
Figure 10:
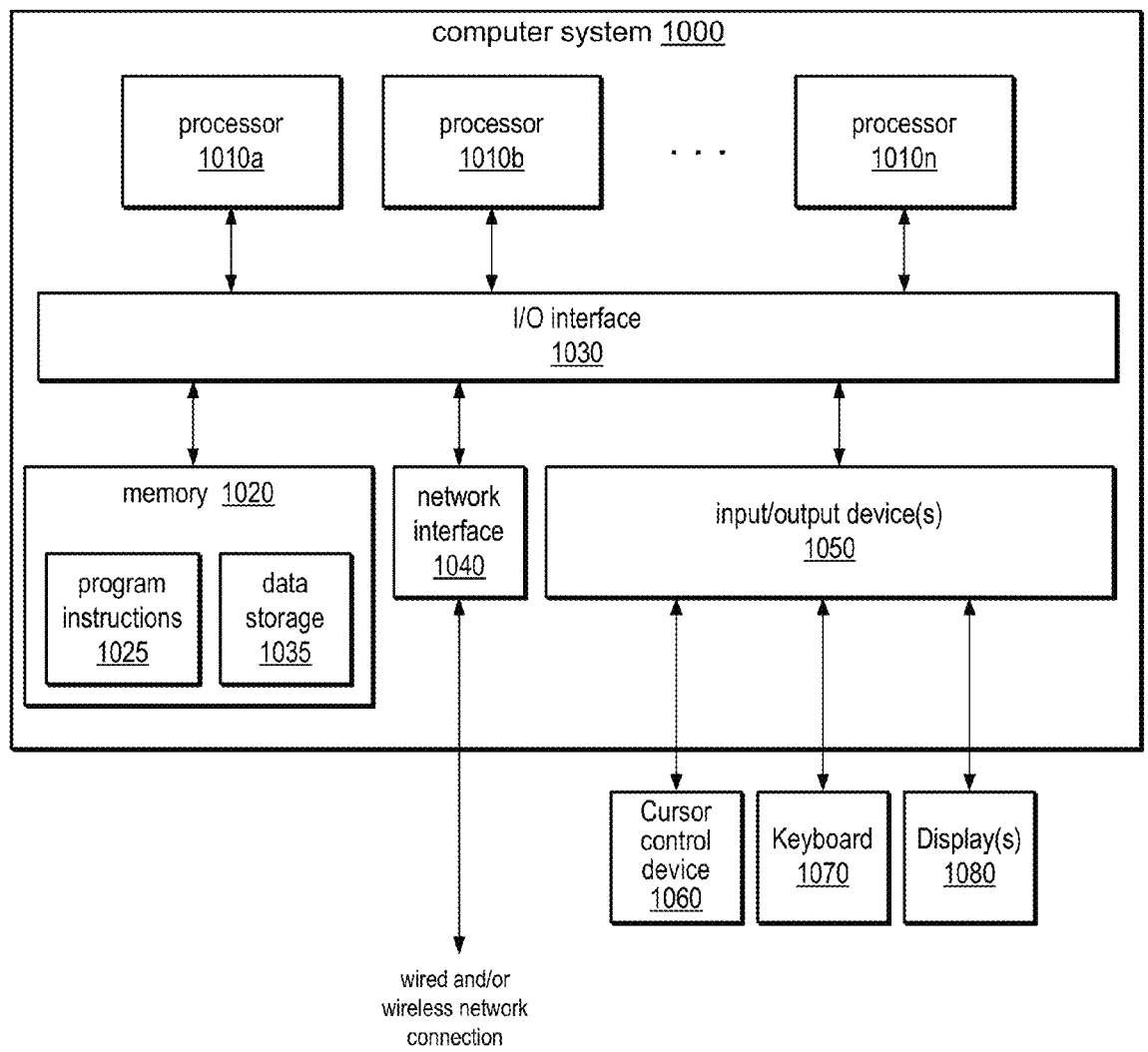
FIG. 10 illustrates an example computer system that may be used to implement robust physically-plausible character animation, according to some embodiments.

FIG. 9 illustrates a quasi-physical simulation module that may implement one or more of the robust physically-plausible character animation techniques and tools described herein. Quasi-physical simulation module 920 may, for example, implement one or more of an articulated character simulator, a motion clip pre-processor, a quasi-physical simulator, and/or a parameterized animation module. FIG. 10 illustrates an example computer system on which embodiments of module 920 may be implemented. Module 920 may receive as input one or more references poses and/or reference clips 910 for an animated character. Module 920 may receive user input 912 initiating the animation (e.g., motion) of the animated character, and/or input representing an external force to be applied to the animated character. Module 920 may then determine the next pose for the animated character, dependent on the user input 912 received via user interface 922 and the one or more reference poses/clips 910, using the quasi-physical simulation module 920. The user may initiate further animation (motion) of the animated character interactively (e.g., in real time) and quasi-physical simulation module 920 may continue to determine the pose of the animated character at each time step of the animation. Module 920 may generate as output one or more output images 930 comprising the animated character in each of its determined poses (e.g., in each frame of the animation) and may display the corresponding poses (e.g., via user interface 922) at each time step. In some embodiments, output image(s) 930 may also be stored, e.g., to a storage medium 940, such as system memory, a disk drive, DVD, CD, etc.

In some embodiments, module 920 may provide a user interface 922 via which a user may interact with the module 920, for example to select an animated character, to define the movement of the animated character, and/or to select or enter values of one or more parameters and/or options of the character animation methods described herein.

In various embodiments, the quasi-physical simulation module described herein may include and/or call other modules to perform various functions of the quasi-physical simulation module. For example, different modules or sub-modules may be configured to perform articulated character modeling, motion clip pre-processing, parameterized generation of reference poses, or quasi-physical simulation. Quasi-physical simulation module 920 illustrated in FIG. 9 may include any or all of these sub-modules, or they may be distinct from, and called by, quasi-physical simulation module 920, in different embodiments.

Some embodiments of the systems described herein may include a means for modeling an articulated character for a character animation exercise. For example, an articulated character simulation module may model a character as a kinematic tree consisting of rigid links and revolute joints, and may formulate computations of the velocity and acceleration of the character's root and/or joints, as described herein. The articulated character simulation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform modeling a character as a kinematic tree consisting of rigid links and revolute joints, and formulating computations of the velocity and acceleration of the character's root and/or joints, as described herein. Other embodiments of the articulated character simulation module may be at least partially implemented by hardware circuitry and/or firmware stored, for example, in a non-volatile memory.

Some embodiments of the systems described herein may include a means for pre-processing one or more motion clips for input to a character animation exercise. For example, a motion clip pre-processing module may access data representing a motion clip, may automatically segment the motions into phases, may associate each frame of the clip with a set of parameter values, and may compute and store derivatives of the parameter values, as described herein. The motion clip pre-processing module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform accessing data representing a motion clip, segmenting the motions into phases, associating each frame of the clip with a set of parameter values, and computing and storing derivatives of the parameter values, as described herein. Other embodiments of the motion clip pre-processing module may be at least partially implemented by hardware circuitry and/or firmware stored, for example, in a non-volatile memory.

Some embodiments of the systems described herein may include a means for providing reference poses from a parameterized space of motions. For example, a parameterized animation module may access data representing a parameterized motion space, may collect a frame from each reference segment for a given parameter value set, and may construct an estimated pose for the parameter value set by blending or warping the collected poses, as described herein. The parameterized animation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform accessing data representing a parameterized motion space, collecting a frame from each reference segment for a given parameter value set, and constructing an estimated pose for the parameter value set by blending or warping the collected poses, as described herein. Other embodiments of the parameterized animation module may be at least partially implemented by hardware circuitry and/or firmware stored, for example, in a non-volatile memory.

Some embodiments of the systems described herein may include a means for performing a quasi-physical simulation for a character animation that reacts to external forces and that may add non-physical forces when necessary to meet a goal constraint. For example, a quasi-physical simulation module may receive input defining a trajectory for an animated character, may receive input representing one or more external forces acting on the animated character, and may perform a simulation of physical forces and (if necessary) non-physical forces to determine the configurations of the character that follow the prescribed trajectory while reacting to the external force(s), as described herein. The quasi-physical simulation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input defining a trajectory for an animated character, receiving input representing one or more external forces acting on the animated character, and performing a simulation of physical forces and (if necessary) non-physical forces to determine the configurations of the character that follow the prescribed trajectory while reacting to the external force(s) as described herein. Other embodiments of the quasi-physical simulation module may be at least partially implemented by hardware circuitry and/or firmware stored, for example, in a non-volatile memory.

Example System

FIG. 10 illustrates an example computer system that may be used to implement robust physically-plausible character animation, according to some embodiments. Embodiments of a quasi-physical simulation module and/or of the various animation and simulation techniques described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the character animation and simulation methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a quasi-physical simulation module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a quasi-physical simulation module as described herein, and data storage 1035, comprising various data accessible by program instructions 1025. In one embodiment, program instructions 1025 may include software elements of embodiments of a quasi-physical simulation module as described herein and illustrated in the above figures. For example, program instruction 1025 may include program instructions executable to implement articulated character modeling, motion clip pre-processing, parameterized generation of reference poses, and/or quasi-physical simulation. Data storage 1035 may include data that may be used in embodiments. For example, data storage 1035 may include data representing one or more reference poses or motion clips, a parameterized motion space, various output image (e.g., animation frames), parameter values, and/or any other data usable by the quasi-physical simulation module described herein. In other embodiments, other or different software elements and data may be included.

Those skilled in the art will appreciate that computer system 1000 is merely illustrative and is not intended to limit the scope of a quasi-physical simulation module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a non-transitory computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the techniques described herein may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
   using a computer to perform operations comprising:
   receiving input defining a trajectory of an animated character as a goal constraint during execution of an interactive application;
   receiving input representing one or more external forces acting on the animated character during execution of the interactive application, a root of the animated character being unactuated by the one or more external forces;
   determining a reference pose for the animated character in a current animation frame in reaction to the one or more external forces, said determining comprising performing a quasi-physical simulation, the quasi-physical simulation being expressed as a linear system enforcing the goal constraint for the horizontal components of a center of mass of the animated character by performing operations comprising:
   determining joint torques to minimize an addition of a non-physical force at the root of the animated character, the joint torques being determined based on a torque objective;
   determining the non-physical force to apply to the root of the animated character to enforce the goal constraint, the determining the non-physical force not being constrained by the laws of physics simulated in the quasi-physical simulation and the goal constraint being expressed as a linear function of joint accelerations;
   adding the determined non-physical force to the root of the animated character; and
   displaying the animated character in its determined pose.

2. The method of claim 1, wherein the animated character is modeled in the quasi-physical simulation as a kinematic tree comprising rigid links and revolute joints; and
   the root acts as a floating base for the kinematic tree.

3. The method of claim 1, wherein the quasi-physical simulation is dependent on one or more of: a pose objective that tracks a reference motion for the animated character, or an end-effector objective that tracks the movement of one or more joints of the animated character that are in contact with the environment.

4. The method of claim 1, further comprising repeating said receiving input representing one or more external forces acting on the animated character, said determining a pose for the animated character in reaction to the one or more external forces, and said displaying the animated character in its determined pose for one or more additional animation frames.

5. The method of claim 1, wherein said determining the reference pose further comprises blending or warping between two or more references poses for the animated character.

6. The method of claim 5, further comprising determining parameter values for the next animation frame dependent on parameter values associated with the two or more reference poses.

7. The method of claim 6, further comprising:
   receiving one or more motion clips, each exhibiting one or more character motions;
   dividing each of the one or more character motions into a plurality of reference segments;
   associating a respective set of parameter values with each frame in each reference segment; and
   computing the reference pose for the animated character in the current animation frame dependent on the sets of parameter values associated with each frame in each reference segment and a particular set of parameter values for the current animation frame.

8. The method of claim 1, wherein the quasi-physical simulation is dependent on a constraint for contact forces that enforces an objective that the contact forces lie within their friction cones.

9. The method of claim 1, wherein the joint torques are determined based on a torque objective based on a weight vector, the weight vector of each joint being the inverse of the mass that is rooted at that joint.

10. The method of claim 9, wherein the torque objective is $E_T(a_k, \lambda)$, and $E_T(a_k, \lambda) = \|Ma_k + C - J_c^T V_c \lambda - T^*\|_{w_T}^2$.

11. A system, comprising:
one or more processors; and
memory, coupled to the one or more processors, comprising program instructions, the program instructions executable by the one or more processors to perform operations comprising:
    receiving input defining a trajectory of an animated character as a goal constraint during execution of an interactive application;
    receiving input representing one or more external forces acting on the animated character during execution of the interactive application, a root of the animated character being unactuated by the one or more external forces;
    determining a reference pose for the animated character in a current animation frame in reaction to the one or more external forces, said determining comprising performing a quasi-physical simulation, the quasi-physical simulation being expressed as a linear system enforcing the goal constraint for the horizontal components of a center of mass of the animated character by performing operations comprising:
        determining joint torques to minimize an addition of a non-physical force at the root of the animated character, the joint torques being determined based on a torque objective;
        determining the non-physical force to apply to the root of the animated character to enforce the goal constraint, the determining the non-physical force not being constrained by the laws of physics simulated in the quasi-physical simulation and the goal constraint being expressed as a linear function of joint accelerations;
        adding the determined non-physical force to the root of the animated character; and
    displaying the animated character in its determined pose.

12. The system of claim 11, wherein the quasi-physical simulation is dependent on one or more of: a pose objective that tracks a reference motion for the animated character, or an end-effector objective that tracks the movement of one or more joints of the animated character that are in contact with the environment.

13. The system of claim 11, wherein the animated character is modeled in the quasi-physical simulation as a kinematic tree comprising rigid links and revolute joints; and
the root acts as a floating base for the kinematic tree.

14. The system of claim 11, the program instructions being further executable by the one or more processors to perform:
    determining parameter values for the next animation frame dependent on parameter values associated with the two or more reference poses; and
    wherein said determining further comprises blending or warping between two or more references poses for the animated character.

15. The system of claim 14, the program instructions being further executable by the one or more processors to perform:
    receiving one or more motion clips, each exhibiting one or more character motions;
    dividing each of the one or more character motions into a plurality of reference segments;
    associating a respective set of parameter values with each frame in each reference segment; and
    computing the reference pose for the animated character in the current animation frame dependent on the sets of parameter values associated with each frame in each reference segment and a particular set of parameter values for the current animation frame.

16. One or more computer-readable storage memories comprising program instructions, the program instructions computer-executable to implement operations comprising:
    receiving input defining a trajectory of an animated character as a goal constraint during execution of an interactive application;
    receiving input representing one or more external forces acting on the animated character, a root of the animated character being unactuated by the one or more external forces;
    determining a reference pose for the animated character in a current animation frame in reaction to the one or more external forces, said determining comprising performing a quasi-physical simulation, the quasi-physical simulation being expressed as a linear system enforcing the goal constraint for the horizontal components of a center of mass of the animated character by performing operations comprising:
        determining joint torques to minimize an addition of a non-physical force at the root of the animated character, the joint torques being determined based on a torque objective;
        determining the non-physical force to apply to the root of the animated character to enforce the goal constraint, the determining the non-physical force not being constrained by the laws of physics simulated in the quasi-physical simulation and the goal constraint being expressed as a linear function of joint accelerations;
        adding the determined non-physical force to the root of the animated character; and
    displaying the animated character in its determined pose.

17. The computer-readable storage memories of claim 16, wherein the quasi-physical simulation is dependent on one or more of: a pose objective that tracks a reference motion for the animated character, or an end-effector objective that tracks the movement of one or more joints of the animated character that are in contact with the environment.

18. The computer-readable storage memories of claim 16, wherein the animated character is modeled in the quasi-physical simulation as a kinematic tree comprising rigid links and revolute joints; and
the root acts as a floating base for the kinematic tree.

19. The computer-readable storage memories of claim 16, the program instructions further executable to implement:
    determining parameter values for the next animation frame dependent on parameter values associated with the two or more reference poses; and
    wherein said determining further comprises blending or warping between two or more references poses for the animated character.

20. The computer-readable storage memories of claim 19, the program instructions further executable to implement:
    receiving one or more motion clips, each exhibiting one or more character motions;

dividing each of the one or more character motions into a plurality of reference segments;
associating a respective set of parameter values with each frame in each reference segment; and
computing the reference pose for the animated character in the current animation frame dependent on the sets of parameter values associated with each frame in each reference segment and a particular set of parameter values for the current animation frame.

* * * * *